US011297340B2

(12) United States Patent
Chien et al.

(10) Patent No.: US 11,297,340 B2
(45) Date of Patent: *Apr. 5, 2022

(54) LOW-COMPLEXITY DESIGN FOR FRUC

(71) Applicant: QUALCOMM Incorporated, San Diego, CA (US)

(72) Inventors: Wei-Jung Chien, San Diego, CA (US); Hsiao-Chiang Chuang, San Diego, CA (US); Xiang Li, Saratoga, CA (US); Jianle Chen, San Diego, CA (US); Li Zhang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/820,152

(22) Filed: Mar. 16, 2020

(65) Prior Publication Data

US 2020/0221110 A1 Jul. 9, 2020

Related U.S. Application Data

(63) Continuation of application No. 16/131,860, filed on Sep. 14, 2018, now Pat. No. 10,785,494.

(Continued)

(51) Int. Cl.
*H04N 19/44* (2014.01)
*H04N 19/513* (2014.01)
(Continued)

(52) U.S. Cl.
CPC ........... *H04N 19/44* (2014.11); *H04N 19/176* (2014.11); *H04N 19/513* (2014.11); *H04N 19/52* (2014.11);
(Continued)

(58) Field of Classification Search
None
See application file for complete search history.

(56) References Cited

U.S. PATENT DOCUMENTS 10,511,835 B2 * 12/2019 Chuang ............... H04N 19/105
10,785,494 B2 * 9/2020 Chien ................. H04N 19/523
(Continued)

FOREIGN PATENT DOCUMENTS

WO 2016160608 A1 10/2016
WO 2016160609 A1 10/2016
(Continued)

OTHER PUBLICATIONS

Tsai T-H., "Accurate Frame Rate Up-Conversion for Advanced Visual Quality", IEEE Transactions on Broadcasting, vol. 62, No. 2, Jun. 2016, pp. 426-435.
(Continued)

*Primary Examiner* — Reza Aghevli
(74) *Attorney, Agent, or Firm* — Campbell C. Chiang; Shumaker & Sieffert, P.A.

(57) ABSTRACT

A method of decoding video data includes constructing, by a video decoder implemented in processing circuitry, a candidate list of motion vector information for a portion of a current frame. The method includes receiving, by the video decoder, signaling information indicating starting motion vector information of the candidate list of motion vector information, the starting motion vector information indicating an initial position in a reference frame. The method includes refining, by the video decoder, based on one or more of bilateral matching or template matching, the starting motion vector information to determine refined motion vector information indicating a refined position in the reference frame that is within a search range from the initial position. The method includes generating, by the video decoder, a predictive block based on the refined motion
(Continued)

vector information and decoding, by the video decoder, the current frame based on the predictive block.

20 Claims, 17 Drawing Sheets

Related U.S. Application Data

(60) Provisional application No. 62/571,161, filed on Oct. 11, 2017.

(51) Int. Cl.
| | |
|---|---|
| *H04N 19/577* | (2014.01) |
| *H04N 19/573* | (2014.01) |
| *H04N 19/176* | (2014.01) |
| *H04N 19/523* | (2014.01) |
| *H04N 19/56* | (2014.01) |
| *H04N 19/52* | (2014.01) |

(52) U.S. Cl.
CPC ........... *H04N 19/523* (2014.11); *H04N 19/56* (2014.11); *H04N 19/573* (2014.11); *H04N 19/577* (2014.11)

(56) References Cited

U.S. PATENT DOCUMENTS

| | | | | |
|---|---|---|---|---|
| 10,820,007 | B2* | 10/2020 | Park | H04N 19/50 |
| 2013/0083853 | A1* | 4/2013 | Coban | H04N 19/51 |
| | | | | 375/240.16 |
| 2013/0163668 | A1* | 6/2013 | Chen | H04N 19/197 |
| | | | | 375/240.14 |
| 2014/0161189 | A1* | 6/2014 | Zhang | H04N 19/103 |
| | | | | 375/240.16 |
| 2014/0169475 | A1* | 6/2014 | Zhang | H04N 19/513 |
| | | | | 375/240.16 |
| 2014/0253681 | A1* | 9/2014 | Zhang | H04N 19/513 |
| | | | | 348/43 |
| 2015/0023423 | A1* | 1/2015 | Zhang | H04N 19/52 |
| | | | | 375/240.16 |
| 2015/0078450 | A1* | 3/2015 | Chen | H04N 19/52 |
| | | | | 375/240.16 |
| 2016/0105670 | A1* | 4/2016 | Pang | H04N 19/176 |
| | | | | 375/240.16 |
| 2016/0286229 | A1 | 9/2016 | Li et al. | |
| 2016/0286230 | A1 | 9/2016 | Li et al. | |
| 2018/0007379 | A1* | 1/2018 | Park | H04N 19/597 |
| 2018/0041769 | A1 | 2/2018 | Chuang et al. | |
| 2018/0199057 | A1* | 7/2018 | Chuang | H04N 19/577 |
| 2018/0249154 | A1* | 8/2018 | Chuang | H04N 19/57 |
| 2018/0270500 | A1 | 9/2018 | Li et al. | |
| 2019/0020895 | A1 | 1/2019 | Liu et al. | |
| 2019/0082192 | A1* | 3/2019 | Chuang | H04N 19/176 |
| 2019/0110058 | A1 | 4/2019 | Chien et al. | |

FOREIGN PATENT DOCUMENTS

| | | | | |
|---|---|---|---|---|
| WO | 2017036414 | A1 | 3/2017 | |
| WO | WO-2017036414 | A1 * | 3/2017 | ............. H04N 19/57 |
| WO | WO-2017157281 | A1 * | 9/2017 | ............ H04N 19/184 |
| WO | WO-2017157281 | A1 * | 9/2017 | ............ H04N 19/184 |
| WO | 2019072368 | A1 | 4/2019 | |

OTHER PUBLICATIONS

Notice of Allowance from U.S. Appl. No. 16/131,860 dated May 20, 2020, 9 pp.
Chen J., et al., "Algorithm Description of Joint Exploration Test Model 7 (JEM 7)," 7th Meeting; Joint Collaborative Team on Video Coding (JCT-VC) of ITU-T SG 16 WP 3 and ISO/IEC JTC 1/SC 29/WG 11, No. JVET-G1001v1, Jul. 13-21, 2017, 50 pp.
Chen X., et al., "EE3: Decoder-Side Motion Vector Refinement Based on Bilateral Template Matching," Joint Video Exploration Team (JVET) of ITU-T SG 16 WP 3 and ISO/IEC JTC 1/SC 29/WG 11, 4th Meeting: Chengdu, CN, Oct. 15-21, 2016, JVET-E0052, pp. 1-4.
Chen Y., et al., "Description of SDR, HDR and 360 Degree Video Coding Technology Proposal by Qualcomm and Technicolor—Low and High Complexity Versions," JVET-J0021, 10th Meeting; San Diego, US, Apr. 10-20, 2018, (The Joint Video Exploration Team of ISO/IEC JTC1/SC29/WG11 and ITU-T SG.16); URL: http://phenix.int-evry.fr/jvet/, pp. 1-43.
Chiu Y-J., et al., "Decoder-side Motion Estimation and Wiener filter for HEVC", 2013 Visual Communications and Image Processing (VCIP), IEEE, Nov. 17, 2013 (Nov. 17, 2013), pp. 1-6, XP032543658, DOI: 10.1109/VCIP.2013.6706446 [retrieved on Jan. 8, 2014].
"ClangFormat," accessed on Apr. 2, 2018, accessed from https://clang.llvm.org/docs/ClangFormat.html, pp. 1-4.
Cmake: "Notable Applications Using CMake", Retrieved from Internet: https://cmake.org/, 2019, 5 pages.
Fuldseth A., et al., "Thor Video Codec," Network Working Group, Internet Draft, Mar. 18, 2016, pp. 1-28.
International Search Report and Written Opinion—PCT/US2018/051314—ISA/EPO—dated Jan. 7, 2019.
ITU-T H.262., "Transmission of Non-Telephone Signals, Information Technology—Generic Coding of Moving Pictures and Associated Audio Information: Video," The International Telecommunication Union, Jul. 1995, 211 pp.
ITU-T H.263, Series H: Audiovisual and Multimedia Systems, Infrastructure of audiovisual services—Coding of moving video, Video coding for low bit rate communication, The International Telecommunication Union. Jan. 2005, 226 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
"ITU-T H.265, Series H: Audiovisual and Multimedia Systems, Infrastructure of audiovisual services—Coding of moving video, High efficiency video coding," The International Telecommunication Union, Apr. 2015, 634 pp, please consider section 7.4.9.6 on p. 102, section 8.5.3.2.6 on p. 141, section 8.5.3.2.7 on pp. 141-145, and section 8.5.3.2.8 an p. 145.
ITU-T Rec. H.261 (Dec. 1990), "Line Transmission on Non-Telephone Signals, Video Codec for Audiovisual Services AT p×64 kbit/s", 32 Pages.
Kamp S., et al., "Decoder-Side Motion Vector Derivation for Block-Based Video Coding", IEEE transactions on circuits and systems for video technology, vol. 22, No. 12, 2012, pp. 1732-1745.
Kim U.S., et al., "New Frame Rate Up-Conversion Algorithms With Low Computational Complexity", IEEE Transactions on circuits and systems for video technology, Mar. 2014, vol. 24, No. 3, pp. 384-393.
Lee W.H., et al., "Frame Rate Up Conversion Based on Variational Image Fusion", IEEE Transactions on Image processing, Jan. 2014, vol. 23, No. 1, pp. 399-412.
Liu H., et al., "Multiple Hypotheses Bayesian Frame Rate Up-Conversion by Adaptive Fusion of Motion-Compensated Interpolations", IEEE transactions on Circuits and Systems for Video Technology, Aug. 2012, vol. 22, No. 8, pp. 1188-1198.
Liu L-K., et al., "A Block-Based Gradient Descent Search Algorithm for Block Motion Estimation in Video Coding," IEEE Transactions on Circuits and Systems for Video Technology, vol. 6, Aug. 1996, pp. 419-422.
Segall A., et al., "Joint Call for Proposals on Video Compression with Capability Beyond HEVC," Joint Video Exploration Team (JVET) of ITU-T SG 16 WP 3 and ISO/IEC JTC 1/SC 29/WG 11, 8th Meeting: Macao, CN, Oct. 18-24, 2017; URL: http://phenix.int-evry.fr/jvet/, No. JVET-H1002, Version 6, Nov. 8, 2017, 27 pages.
Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012 (Dec. 1, 2012), pp. 1649-1668, XP011487803, ISSN: 1051-8215, DOI: 10.1109/TCSVT.2012.2221191.

(56) References Cited

OTHER PUBLICATIONS

Tham J Y., et al., "A Novel Unrestricted Center-Biased Diamond Search Algorithm for Block Motion Estimation," IEEE Transactions on Circuits and Systems for Video Technology, Aug. 1998, vol. 8, No. 4, pp. 369-377.
Zhu C., et al., "Hexagon-Based Search Pattern for Fast Block Motion Estimation", IEEE Transactions on Circuits and Systems Video Technology, May 2002, vol. 12, No. 5, pp. 349-355.
Prosecution History for U.S. Appl. No. 16/131,860 dated from Oct. 8, 2019 through Jan. 30, 2020, 39 pages.
Taiwan Search Report—TW107132866—TIPO—dated Nov. 18, 2020.

* cited by examiner

LOW-COMPLEXITY DESIGN FOR FRUC

This application is a continuation application of U.S. patent application Ser. No. 16/131,860, filed on Sep. 14, 2018, which claims the benefit of U.S. Provisional Patent Application 62/571,161, filed on Oct. 11, 2017, the entire content of each of which is hereby incorporated by reference.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the ITU-T H.265, High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized.

SUMMARY

In general, this disclosure describes techniques related to improvements over existing techniques for Frame-Rate Up-Conversion (FRUC). US Patent Publication No. US-2016-0286230 describes techniques based on FRUC. The techniques of this disclosure for low complexity FRUC may be applied to any of the existing video codecs, such as HEVC (High Efficiency Video Coding), or may be an efficient coding tool for future video coding standards, such as the Versatile Video Coding standard presently under development. More particularly, this disclosure describes techniques related to reducing an amount of reference samples used from external memory to perform search operations for FRUC.

In one example, a method of decoding video data includes constructing, by a video decoder implemented in processing circuitry, a candidate list of motion vector information for a portion of a current frame, receiving, by the video decoder, signaling information indicating starting motion vector information of the candidate list of motion vector information, the starting motion vector information indicating an initial position in a reference frame, refining, by the video decoder, based on one or more of bilateral matching or template matching, the starting motion vector information to determine refined motion vector information indicating a refined position in the reference frame that is within a search range from the initial position, generating, by the video decoder, a predictive block based on the refined motion vector information, and decoding, by the video decoder, the current frame based on the predictive block.

In another example, a device for decoding video data includes a memory configured to store the video data and processing circuitry. The processing circuitry is configured to construct a candidate list of motion vector information for a portion of a current frame, receive signaling information indicating starting motion vector information of the candidate list of motion vector information, the starting motion vector information indicating an initial position in a reference frame, refine, based on one or more of bilateral matching or template matching, the starting motion vector information to determine refined motion vector information indicating a refined position in the reference frame that is within a search range from the initial position, generate a predictive block based on the refined motion vector information, and decode the current frame based on the predictive block.

In another example, a non-transitory computer-readable computer readable medium is configured with one or more instructions that, when executed, cause one or more processors to construct a candidate list of motion vector information for a portion of a current frame, receive signaling information indicating starting motion vector information of the candidate list of motion vector information, the starting motion vector information indicating an initial position in a reference frame, refine, based on one or more of bilateral matching or template matching, the starting motion vector information to determine refined motion vector information indicating a refined position in the reference frame that is within a search range from the initial position, generate a predictive block based on the refined motion vector information, and decode the current frame based on the predictive block.

In another example, a device comprises means for constructing a candidate list of motion vector information for a portion of a current frame, receiving signaling information indicating starting motion vector information of the candidate list of motion vector information, the starting motion vector information indicating an initial position in a reference frame, refining, based on one or more of bilateral matching or template matching, the starting motion vector information to determine refined motion vector information indicating a refined position in the reference frame that is within a search range from the initial position, generating a predictive block based on the refined motion vector information, and decoding the current frame based on the predictive block.

In another example, a method of encoding video data includes constructing, by a video encoder implemented in processing circuitry, a candidate list of motion vector information for a portion of a current frame, selecting, by the video encoder, starting motion vector information of the candidate list of motion vector information, the starting motion vector information indicating an initial position in a reference frame, refining, by the video encoder, based on one or more of bilateral matching or template matching, the starting motion vector information to determine refined motion vector information indicating a refined position in the reference frame that is within a search range from the initial position, generating, by the video encoder, a predictive block based on the refined motion vector information, generating, by the video encoder, residual sample values for the current block of video data based on the predictive block, and outputting, by the video encoder, an indication of the residual sample values and signaling information indicating the starting motion vector information of the candidate list of motion vector information.

In another example, a device for encoding video data includes a memory configured to store the video data and processing circuitry. The processing circuitry is configured to construct a candidate list of motion vector information for a portion of a current frame, select starting motion vector information of the candidate list of motion vector information, the starting motion vector information indicating an initial position in a reference frame, refine, based on one or more of bilateral matching or template matching, the starting motion vector information to determine refined motion vector information indicating a refined position in the reference frame that is within a search range from the initial position, generate a predictive block based on the refined motion vector information, generate residual sample values for the current block of video data based on the predictive block, and output an indication of the residual sample values and signaling information indicating the starting motion vector information of the candidate list of motion vector information.

In another example, a non-transitory computer-readable computer readable medium is configured with one or more instructions that, when executed, cause one or more processors to construct a candidate list of motion vector information for a portion of a current frame, select starting motion vector information of the candidate list of motion vector information, the starting motion vector information indicating an initial position in a reference frame, refine, based on one or more of bilateral matching or template matching, the starting motion vector information to determine refined motion vector information indicating a refined position in the reference frame that is within a search range from the initial position, generate a predictive block based on the refined motion vector information, generate residual sample values for the current block of video data based on the predictive block, and output an indication of the residual sample values and signaling information indicating the starting motion vector information of the candidate list of motion vector information.

In another example, a device comprises means for constructing a candidate list of motion vector information for a portion of a current frame, selecting starting motion vector information of the candidate list of motion vector information, the starting motion vector information indicating an initial position in a reference frame, refining, based on one or more of bilateral matching or template matching, the starting motion vector information to determine refined motion vector information indicating a refined position in the reference frame that is within a search range from the initial position, generating a predictive block based on the refined motion vector information, generating residual sample values for the current block of video data based on the predictive block, and outputting an indication of the residual sample values and signaling information indicating the starting motion vector information of the candidate list of motion vector information.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Figure 1:
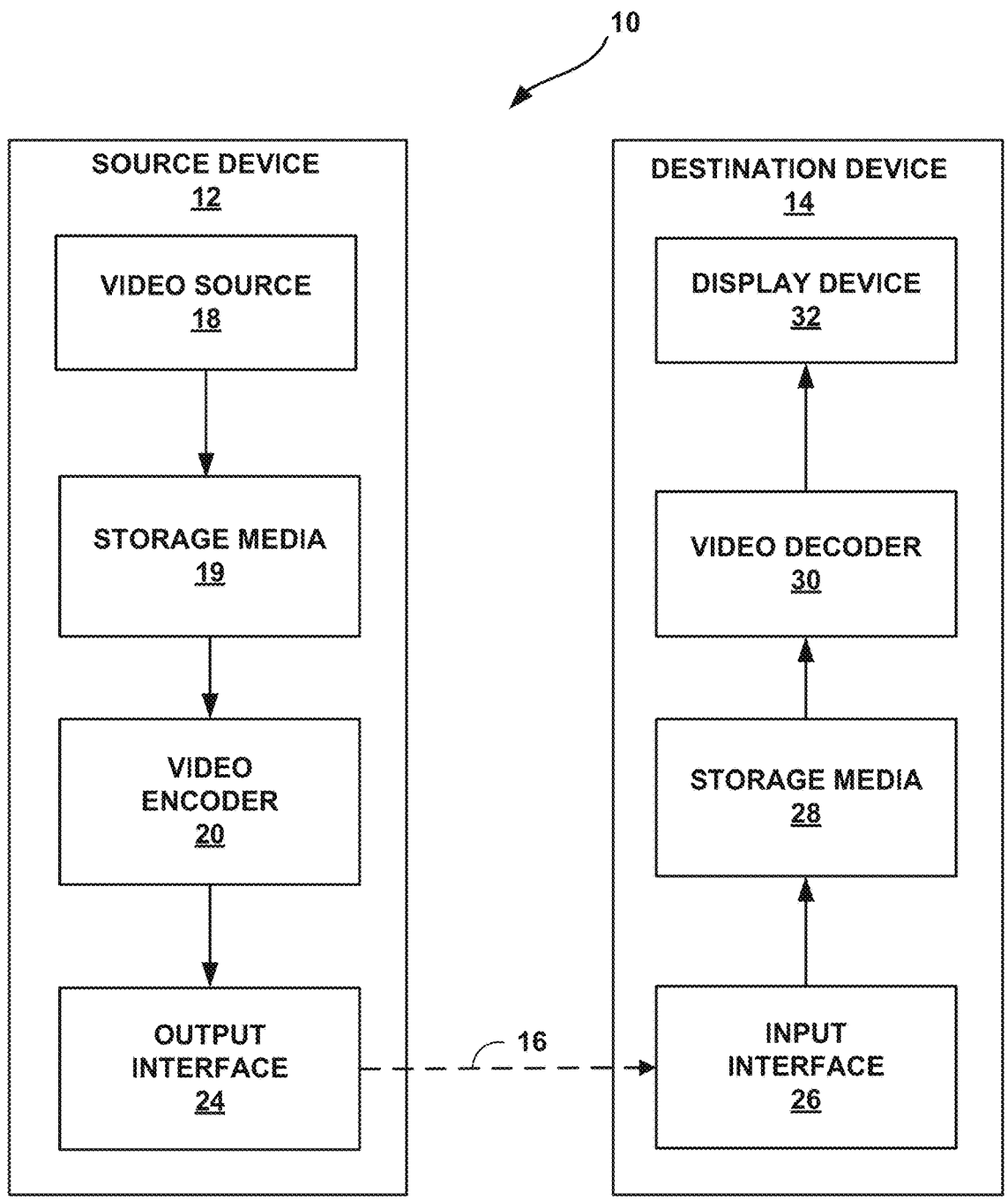
FIG. 1 is a block diagram illustrating an example video encoding and decoding system that may utilize one or more techniques described in this disclosure.

Techniques of this disclosure relate to decoder side motion information derivation, block partition, and/or video data interpolation in block-based video coding. The techniques may be applied to any of the existing video codecs, such as High Efficiency Video Coding (HEVC) or be an efficient coding tool for any future video coding standards.

Video coding devices implement video compression techniques to encode and decode video data efficiently. Video compression techniques may include applying spatial prediction (e.g., intra-frame prediction), temporal prediction (e.g., inter-frame prediction), and/or other prediction techniques to reduce or remove redundancy inherent in video sequences. A video encoder typically partitions each picture of an original video sequence into rectangular regions referred to as video blocks or coding units (described in greater detail below). These video blocks may be encoded using a particular prediction mode.

For inter-prediction modes, a video encoder typically searches for a block similar to the one being encoded in a frame in another temporal location, referred to as a reference frame. The video encoder may restrict the search to a certain spatial displacement from the block to be encoded. A best match may be located using a two-dimensional (2D) motion vector that includes a horizontal displacement component and a vertical displacement component. For an intra-prediction mode, a video encoder may form the predicted block using spatial prediction techniques based on data from previously encoded neighboring blocks within the same picture.

The video encoder may determine a prediction error, i.e., the difference between the pixel values in the block being encoded and the predicted block (also referred to as residual). The video encoder may also apply a transform to the prediction error, such as a discrete cosine transform (DCT), to generate transform coefficients. After transformation, the video encoder may quantize the transform coefficients. The quantized transform coefficients and motion vectors may be represented using syntax elements, and, along with control information, form a coded representation of a video sequence. In some instances, the video encoder may entropy code syntax elements, thereby further reducing the number of bits needed for their representation.

A video decoder may, using the syntax elements and control information discussed above, construct predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error.

In some instances, a video decoder or post-processing device may interpolate pictures based on one or more reference pictures. Such interpolated pictures are not included in an encoded bitstream. The video decoder or post-processing device may interpolate pictures to up-convert an original frame rate of an encoded bitstream. This process may be referred to as frame rate up-conversion (FRUC). Alternatively, or additionally, the video decoder or post-processing device may interpolate pictures to insert one or more pictures that were skipped by a video encoder to encode a video sequence at a reduced frame rate. In either case, the video decoder or post-processing device interpolates frames that are not included in an encoded bitstream that has been received by the video decoder. The video decoder or post-processing device may interpolate the pictures using any of a number of interpolation techniques, e.g., using motion compensated frame interpolation, frame repeat, or frame averaging.

While certain techniques for interpolating pictures have been used for purposes of up-conversion, such techniques have not been widely used during video coding, e.g., to code video data that is included in an encoded bitstream. For example, the techniques for interpolating pictures may be relatively time intensive and/or require a relatively large amount of processing power. Accordingly, such techniques typically have not been performed in-loop when decoding video data.

In accordance with one or more techniques described herein, rather than retrieving reference samples from external memory to perform a search for each motion vector of a candidate list of motion vector information (e.g., seeding motion vectors), a video decoder may retrieve only samples from external memory to perform a search for starting motion vector information of the candidate list of motion vector information that is signaled by a video encoder. In this way, the video decoder may reduce an amount of reference samples used from external memory to perform search, thereby reducing an amount of energy used to perform decoder side motion information derivation. For example, configurating a video decoder to receive signaling information indicating starting motion vector information of a candidate list of motion vector information and to refine the starting motion vector information may reduce an amount of energy used to perform decoder side motion information derivation. In some examples, configuring a video encoder to select starting motion vector information of a candidate list of motion vector information and to output an indication of signaling information indicating the starting motion vector information of the candidate list of motion vector information may reduce an amount of energy used to perform decoder side motion information derivation.

As used in this disclosure, the term video coding generically refers to either video encoding or video decoding. Similarly, the term video coder may generically refer to a video encoder or a video decoder. Moreover, certain techniques described in this disclosure with respect to video decoding may also apply to video encoding, and vice versa. For example, often times video encoders and video decoders are configured to perform the same process, or reciprocal processes. Also, video encoders typically perform video decoding as part of the processes of determining how to encode video data.

FIG. 1 is a block diagram illustrating an example video encoding and decoding system 10 that may utilize the FRUC techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may include any of a wide range of devices, including desktop computers, notebook (i.e., laptop) computers, tablet computers, set-top boxes, telephone handsets such as so-called "smart" phones, tablet computers, televisions, cameras, display devices, digital media players, video gaming consoles, video streaming device, or the like. In some cases, source device 12 and destination device 14 may be equipped for wireless communication. Thus, source device 12 and destination device 14 may be wireless communication devices. Source device 12 is an example video encoding device (i.e., a device for encoding video data). Destination device 14 is an example video decoding device (i.e., a device for decoding video data).

In the example of FIG. 1, source device 12 includes a video source 18, storage media 19 configured to store video data, a video encoder 20, and an output interface 24. Destination device 14 includes an input interface 26, a storage media 28 configured to store encoded video data, a video decoder 30, and display device 32. In other examples, source device 12 and destination device 14 include other components or arrangements. For example, source device 12 may receive video data from an external video source, such as an external camera. Likewise, destination device 14 may interface with an external display device, rather than including an integrated display device.

The illustrated system 10 of FIG. 1 is merely one example. Techniques for processing video data may be performed by any digital video encoding and/or decoding device. Although generally the techniques of this disclosure are performed by a video encoding device, the techniques may also be performed by a video encoder/decoder, typically referred to as a "CODEC." Source device 12 and destination device 14 are merely examples of such coding devices in which source device 12 generates coded video data for transmission to destination device 14. In some examples, source device 12 and destination device 14 may operate in a substantially symmetrical manner such that each of source device 12 and destination device 14 include video encoding and decoding components. Hence, system 10 may support one-way or two-way video transmission between source device 12 and destination device 14, e.g., for video streaming, video playback, video broadcasting, or video telephony.

Video source 18 of source device 12 may include a video capture device, such as a video camera, a video archive containing previously captured video, and/or a video feed interface to receive video data from a video content provider. As a further alternative, video source 18 may generate computer graphics-based data as the source video, or a combination of live video, archived video, and computer-generated video. Source device 12 may comprise one or more data storage media (e.g., storage media 19) configured to store the video data. The techniques described in this disclosure may be applicable to video coding in general, and may be applied to wireless and/or wired applications. In each case, the captured, pre-captured, or computer-generated video may be encoded by video encoder 20. Output interface 24 may output the encoded video information to a computer-readable medium 16.

Destination device 14 may receive the encoded video data to be decoded via computer-readable medium 16. Computer-readable medium 16 may comprise any type of medium or device capable of moving the encoded video data from source device 12 to destination device 14. In some examples, computer-readable medium 16 comprises a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may comprise one or more data storage media configured to store encoded video data and decoded video data.

In some examples, encoded data may be output from output interface 24 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 of destination device 14 receives information from computer-readable medium 16. The information of computer-readable medium 16 may include syntax information defined by video encoder 20 of video encoder 20, which is also used by video decoder 30, that includes syntax elements that describe characteristics and/or processing of blocks and other coded units, e.g., groups of pictures (GOPs). Storage media 28 may be configured to store encoded video data, such as encoded video data (e.g., a bitstream) received by input interface 26. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In some examples, video encoder 20 and video decoder 30 may operate according to a video coding standard such as an existing or future standard. Example video coding standards include, but are not limited to, ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions. In addition, a new video coding standard, namely High Efficiency Video Coding (HEVC) or ITU-T H.265, including its range and screen content coding extensions, 3D video coding (3D-HEVC) and multiview extensions (MV-HEVC) and scalable extension (SHVC), has recently been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may encode blocks of a picture of the video data. Video encoder 20 may include, in a bitstream, an encoded representation of the video block. For example, in HEVC, to generate an encoded representation of a picture, video encoder 20 may generate a set of coding tree units (CTUs). Each of the CTUs may comprise one or more coding tree blocks (CTBs) and may comprise syntax structures used to code the samples of the one or more coding tree blocks. For instance, each a CTU may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). A syntax structure may be defined as zero or more syntax elements present together in the bitstream in a specified order. The size of a CTB can range from 16×16 to 64×64 in the HEVC main profile (although technically 8×8 CTB sizes can be supported).

In HEVC, a slice includes an integer number of CTUs ordered consecutively in a raster scan order. Thus, in HEVC, the largest coding unit in a slice is called a coding tree block (CTB).

In HEVC, to generate a coded CTU of a picture, video encoder 20 may recursively perform quad-tree partitioning on the coding tree blocks of a CTU to divide the coding tree blocks into coding blocks, hence the name "coding tree units." A coding block is an N×N block of samples. A coding unit (CU) may comprise one or more coding blocks and syntax structures used to code samples of the one or more coding blocks. For example, a CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block. Thus, a CTB may contain a quad-tree, the nodes of which are CUs.

Furthermore, video encoder 20 may encode a CU. For instance, to encode a CU, video encoder 20 may partition a coding block of a CU into one or more prediction blocks. A prediction block is a rectangular (i.e., square or non-square) block of samples on which the same prediction is applied. A prediction unit (PU) of a CU may comprise one or more prediction blocks of a CU and syntax structures used to predict the one or more prediction blocks. For example, a PU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive blocks (e.g., luma, Cb, and Cr predictive blocks) for prediction blocks (e.g., luma, Cb, and Cr prediction blocks) of each PU of the CU.

In HEVC, each CU is coded with one mode, which could be either intra mode or inter mode. When a CU is inter coded (i.e., inter mode is applied), the CU may be further partitioned into 2 or 4 PUs or become just one PU when further partitioning does not apply. When two PUs are present in one CU, the two PUs can be half size rectangles or two rectangle sizes with ¼ or ¾ size of the CU. There are eight partition modes for a CU coded with inter prediction mode, i.e., PART_2N×2N, PART_2N×N, PART_N×2N, PART_N×N, PART_2N×nU, PART_2N×nD, PART_nL×2N and PART_nR×2N, as shown in FIG. 3.

When the CU is inter coded, one set of motion information is present for each PU. In addition, each PU is coded with a unique inter-prediction mode to derive the set of motion information. If video encoder 20 uses intra prediction to generate the predictive blocks of a PU, video encoder 20 may generate the predictive blocks of the PU based on decoded samples of the picture that includes the PU. When a CU is intra coded, 2N×2N and N×N are the only permissible PU shapes, and within each PU a single intra prediction mode is coded (while chroma prediction mode is signalled at CU level). The N×N intra PU shapes are only allowed when the current CU size is equal to the smallest CU size defined in a sequence parameter set (SPS).

Video encoder 20 may generate one or more residual blocks for the CU. For instance, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the Cb residual block of a CU may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may decompose the residual blocks of a CU into one or more transform blocks. For instance, video encoder 20 may use quad-tree partitioning to decompose the residual blocks of a CU into one or more transform blocks. A transform block is a rectangular (e.g., square or non-square) block of samples on which the same transform is applied. A transform unit (TU) of a CU may comprise one or more transform blocks. For example, a TU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms a transform block of a TU to generate a coefficient block for the TU. For instance, video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

In some examples, video encoder 20 skips application of the transforms to the transform block. In such examples, video encoder 20 may treat residual sample values may be treated in the same way as transform coefficients. Thus, in examples where video encoder 20 skips application of the transforms, the following discussion of transform coefficients and coefficient blocks may be applicable to transform blocks of residual samples.

After generating a coefficient block, video encoder 20 may quantize the coefficient block. Quantization generally refers to a process in which transform coefficients are quantized to possibly reduce the amount of data used to represent the transform coefficients, providing further compression. In some examples, video encoder 20 skips quantization. After video encoder 20 quantizes a coefficient block, video encoder 20 may generate syntax elements indicating the quantized transform coefficients. Video encoder 20 may entropy encode one or more of the syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes encoded video data. For example, the bitstream may comprise a sequence of bits that forms a representation of coded pictures of the video data and associated data. Thus, the bitstream comprises an encoded representation of video data. In some examples, a representation of a coded picture may include encoded representations of blocks. Thus, video encoder 20 may signal, in the bitstream, transform coefficients of a block in an encoded representation of the block. In some instances, video encoder 20 may use one or more syntax elements to signal each transform coefficient of the block.

The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and encapsulates a RBSP. The NAL unit header may include a syntax element indicating a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In 2016, MPEG and ITU-T VCEG formed a joint exploration video team (WET) to explore new coding tools for the next generation of video coding standard. The reference software is called JEM (joint exploration model). For each block, a set of motion information can be available. A set of motion information contains motion information for forward and backward prediction directions. Here forward and backward prediction directions are two prediction directions of a bi-directional prediction mode and the terms "forward" and "backward" do not necessarily have a geometry meaning, instead the terms correspond to reference picture list 0 (RefPicList0) and reference picture list 1 (RefPicList1) of a current picture. When only one reference picture list is available for a picture or slice, only RefPicList0 is available and the motion information of each block of a slice is always forward.

In some cases, a motion vector together with its reference index is used in decoding processes, such a motion vector with the associated reference index is denoted as a uni-predictive set of motion information. In some systems, for each prediction direction, the motion information must contain a reference index and a motion vector. In some cases, for simplicity, a motion vector itself may be referred in a way that it is assumed that the motion vector has an associated reference index. A reference index is used to identify a reference picture in the current reference picture list (RefPicList0 or RefPicList1). A motion vector has a horizontal and a vertical component.

Picture order count (POC) is widely used in video coding standards to identify a display order of a picture. Although there are cases two pictures within one coded video sequence may have the same POC value, this typically does not happen within a coded video sequence. When multiple coded video sequences are present in a bitstream, pictures with a same value of POC may be closer to each other in terms of decoding order. POC values of pictures may be used for reference picture list construction, derivation of reference picture set as in HEVC and motion vector scaling.

In H.264/AVC, each inter macroblock (MB) may be partitioned into four different ways: one 16×16 MB partition; two 16×8 MB partitions; two 8×16 MB partitions; or four 8×8 MB partitions. Different MB partitions in one MB may have different reference index values for each direction (RefPicList0 or RefPicList1). When an MB is not partitioned into four 8×8 MB partitions, the MB may have only one motion vector for each MB partition in each direction.

In H.264/AVC, when an MB is partitioned into four 8×8 MB partitions, each 8×8 MB partition can be further partitioned into sub-blocks, each of which can have a different motion vector in each direction. There may be four different ways to get sub-blocks from an 8×8 MB partition: one 8×8 sub-block; two 8×4 sub-blocks; two 4×8 sub-blocks; or four 4×4 sub-blocks. Each sub-block can have a different motion vector in each direction. Therefore, motion vector is present in a level equal to higher than sub-block.

In AVC, temporal direct mode could be enabled in either MB or MB partition level for skip or direct mode in B slices. For each MB partition, the motion vectors of the block co-located with the current MB partition in the RefPicList1 [0] of the current block are used to derive the motion vectors. Each motion vector in the co-located block may be scaled based on POC distances. In AVC, a direct mode can also predict motion information from the spatial neighbors.

In HEVC, the largest coding unit in a slice is called a coding tree block (CTB). A CTB contains a quad-tree the nodes of which are coding units. The size of a CTB can be ranges from 16×16 to 64×64 in the HEVC main profile (although technically 8×8 CTB sizes can be supported). A coding unit (CU) could be the same size of a CTB although and as small as 8×8. Each coding unit is coded with one mode (either intra mode or inter mode). When a CU is inter coded, the CU may be further partitioned into 2 or 4 prediction units (PUs) or become just one PU when further partition doesn't apply. When two PUs are present in one CU, the two PUs can be half size rectangles or two rectangle size with ¼ or ¾ size of the CU.

When the CU is inter coded, one set of motion information is present for each PU. In addition, each PU is coded with a unique inter-prediction mode to derive the set of motion information.

In the HEVC standard, there are two inter prediction modes, named merge (skip is considered as a special case of merge) and advanced motion vector prediction (AMVP) modes respectively for a prediction unit (PU).

In either AMVP or merge mode, a motion vector (MV) candidate list is maintained for multiple motion vector predictors. The motion vector(s), as well as reference indices in the merge mode, of the current PU are generated by taking one candidate from the MV candidate list.

The MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode for each potential prediction direction from either list 0 or list 1, a reference index needs to be explicitly signaled, together with an MVP index to the MV candidate list since the AMVP candidate contains only a motion vector. In AMVP mode, the predicted motion vectors can be further refined.

A merge candidate may correspond to a full set of motion information while an AMVP candidate contains just one motion vector for a specific prediction direction and reference index. The candidates for both modes are derived similarly from the same spatial and temporal neighboring blocks. Spatial MV candidates are derived from the neighboring blocks shown in FIGS. 2A and 2B, for a specific PU (PU0), although the techniques generating the candidates from the blocks differ for merge and AMVP modes.

Figure 2B:
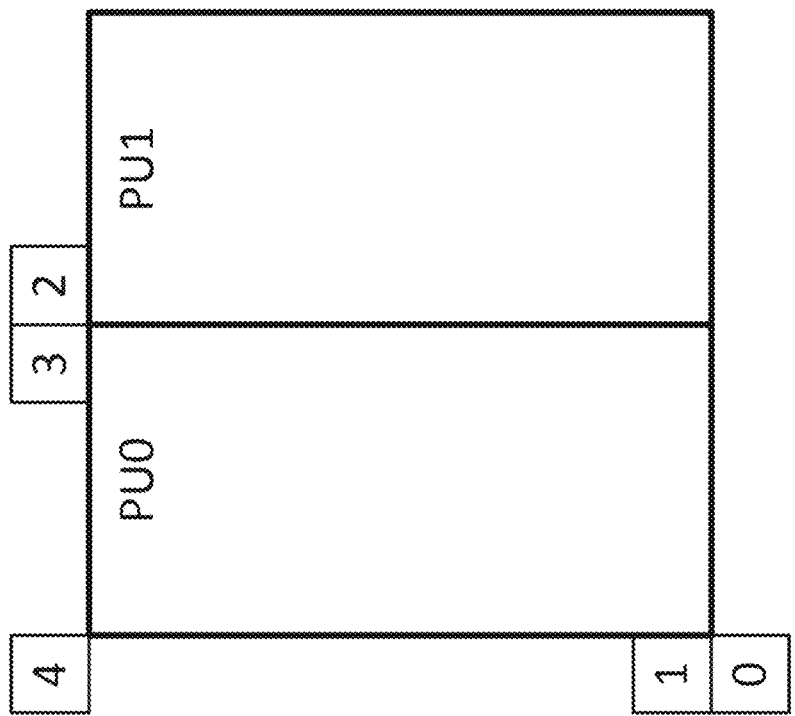
FIG. 2B is a conceptual diagram illustrating spatial neighboring MV candidates for AMVP mode.
Figure 2A:
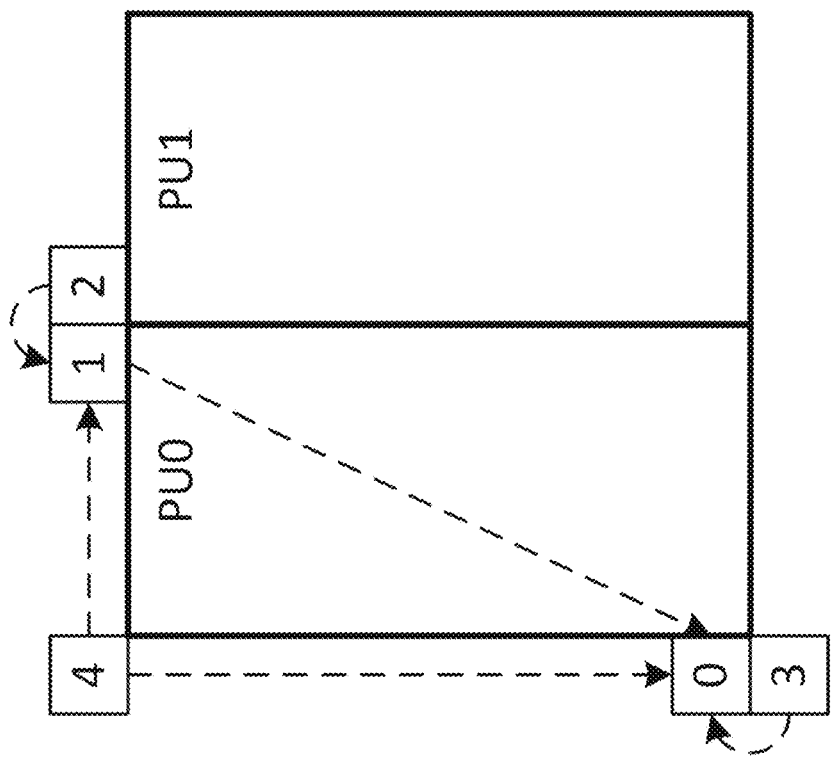
FIG. 2A is a conceptual diagram illustrating spatial neighboring MV candidates for merge mode.

FIGS. 2A and 2B are conceptual diagrams illustrating spatial neighboring candidates in HEVC. In some examples, video encoder 20 and/or video decoder 30 may derive spatial motion vector (MV) candidates from the neighboring block 0, neighboring block 1, neighboring block 2, neighboring block 3 or neighboring block 4 for PU0.

In some instances, the techniques for generating the MV candidates from the blocks differ for merge and AMVP modes. FIG. 2A illustrates one example for merge mode. For example, in HEVC, a video coder (e.g., such as video encoder 20 and/or video decoder 30 of FIG. 1) may derive up to four spatial MV candidates. The candidates may be included in a candidate list having a particular order. In one example, the order for the example of FIG. 2A may be neighboring block 0 (A1), neighboring block 1 (B1), neighboring block 2 (B0), neighboring block 3 (A0) and neighboring block 4 (B2).

FIG. 2B illustrates one example for AMVP mode. For example, in HEVC, the video coder may divide neighboring blocks into two groups: left group including of the neighboring block 0 and neighboring block 1, and above group including neighboring block 2, neighboring block 3, and neighboring block 4. For each group, the potential motion vector candidate associated with a neighboring block referring to the same reference picture as that indicated by the signaled reference index (for the block currently being coded) may have the highest priority to be chosen to form a final candidate of the group. It is possible that none of the neighboring block contain a motion vector pointing to the same reference picture. Therefore, if such a candidate cannot be found, the video coder may scale the first available candidate to form the final candidate, thus the temporal distance differences may be compensated.

According to aspects of this disclosure, motion vector candidates, such as the motion vectors associated with the neighboring blocks shown in FIGS. 2A and 2B may be used to derive a motion vector for a block. For example, the video coder may generate a candidate list that includes motion vector candidates (e.g., a candidate list of motion vector information) from the neighboring blocks shown in FIGS. 2A and 2B. In this example, the video coder may use one or more of the candidates of the candidate list as an initial motion vector (e.g., starting motion vector information) in a motion information derivation process (e.g., bilateral matching, template matching, or the like). The video coder may apply one or more of the motion vector candidates in a motion search of a motion vector derivation process to identify reference data. The video coder may select the candidate from the list that identifies closely matching reference data. For example, the video coder may perform a motion search for a first set of reference data that corresponds to a second set of reference data outside of the current block. The video coder may, in some instances, further refine the candidate, e.g., by performing an additional motion search in an area indicated by the selected candidate, to determine a derived motion vector using the motion information derivation process.

Figure 3B:
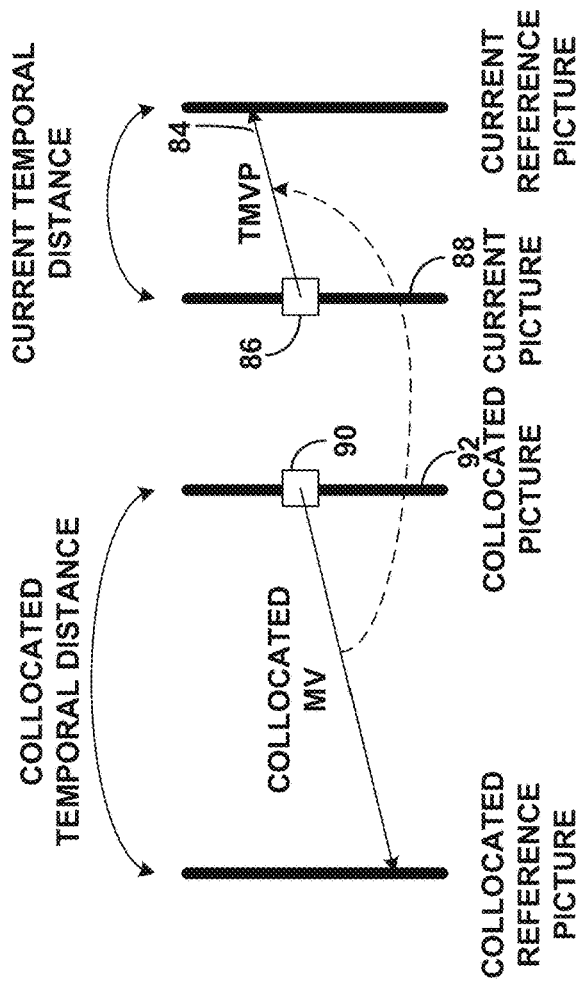
FIG. 3B is a second conceptual diagram illustrating temporal motion vector prediction in HEVC.
Figure 3A:
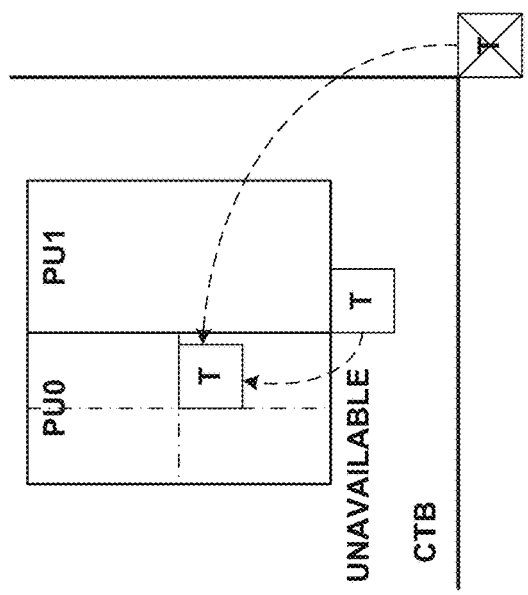
FIG. 3A is a first conceptual diagram illustrating temporal motion vector prediction in HEVC.

FIGS. 3A and 3B are conceptual diagrams illustrating temporal motion vector prediction in HEVC. A temporal motion vector predictor (TMVP) candidate, if enabled and available, is added into a MV candidate list after spatial motion vector candidates. In HEVC, the process of motion vector derivation for a TMVP candidate is the same for both merge and AMVP modes, however, the target reference index for the TMVP candidate in the merge mode is typically set to zero.

FIG. 3A illustrates a primary block location (shown as block "T") for a TMVP candidate, which is the bottom right block outside of the collocated PU. The location may compensate for the bias to the above and left blocks used to generate spatial neighboring candidates. However, if block T is located outside of the current CTB row or motion information is not available, the block is substituted with a center block of the PU, as illustrated by the dashed arrows from block T in FIG. 3A.

FIG. 3B illustrates deriving a TMVP candidate 84 for a current block 86 of a current picture 88 from a co-located PU 90 of a co-located picture 92, as indicated at the slice level (e.g., in a slice header). Similar to temporal direct mode in AVC, a motion vector of the TMVP candidate may be subject to motion vector scaling, which is performed to compensate the distance differences, e.g., temporal distances between pictures. With respect to motion vector scaling, a video coder (such as video encoder 20 and/or video decoder 30) may be configured to initially determine that the value of motion vectors is proportional to the distance of pictures in the presentation time. A motion vector associates two pictures, the reference picture, and the picture containing the motion vector (namely, the containing picture). When a motion vector is utilized to predict the other motion vector, the distance of the containing picture and the reference picture is calculated based on the POC values.

For a motion vector to be predicted, both the associated containing picture for the motion vector and a reference picture of the motion vector may be different. Therefore, the video coder may calculate a new distance based on POC values, and the video coder may scale the motion vector based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

In some examples, a video coder may be configured to determine one or more artificial motion vector candidates. For example, if a motion vector candidate list is not complete, the video coder may generate artificial motion vector candidates and insert the artificial motion vector candidates at the end of the list until the list includes a predetermined number of entries. In merge mode, there are two types of artificial MV candidates including a combined candidate derived only for B-slices and a zero candidate. In some instances, the zero candidate is used only for AMVP if the combined type does not provide enough artificial candidates.

For each pair of candidates that are already in the candidate list and have necessary motion information, bidirectional combined motion vector candidates are derived by a combination of the motion vector of the first candidate referring to a picture in the list 0 and the motion vector of a second candidate referring to a picture in the list 1.

According to aspects of this disclosure, motion vector candidates, such as the TMVP shown in FIGS. 3A and 3B, may be used to derive a motion vector for a block. For example, the video coder may generate a candidate list that includes a TMVP determined according to process described above. In this example, the video coder may use the TMVP as an initial motion vector in a motion information derivation process (e.g., bilateral matching, template matching, or the like). The video coder may apply the TMVP in a motion vector derivation process to identify reference data. The video coder may select the TMVP in instances in which the TMVP identifies closely matching reference data. The video coder may, in some instances, further refine the TMVP to determine a derived motion vector using the motion information derivation process.

In some examples, the video coder may prune a candidate list that includes motion vector candidates. For example, in some instances, candidates from different blocks may happen to be the same, which decreases the efficiency of a merge/AMVP candidate list. The video code may apply a pruning process to solve this problem. The video coder may compare one candidate against the others in the current candidate list to avoid inserting an identical candidate. To reduce the complexity, the video coder may apply only limited numbers of pruning processes instead of comparing each potential one with all the other existing ones.

In some examples, the value of motion vectors is proportional to the distance of pictures in the presentation time. In such examples, a motion vector may associate two pictures, the reference picture, and the picture containing the motion vector (namely the containing picture). When a motion vector is utilized to predict the other motion vector, the distance of the containing picture and the reference picture is calculated based on the POC values.

For a motion vector to be predicted, both its associated containing picture and reference picture may be different. Therefore, a new distance (e.g., based on POC) is calculated. And the motion vector is scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

If a motion vector candidate list is not complete, artificial motion vector candidates may be generated and inserted at the end of the list until the motion vector candidate list will have all candidates. In merge mode, there are two types of artificial MV candidates: combined candidate derived only for B-slices and zero candidates used only for AMVP if the first type doesn't provide enough artificial candidates. For each pair of candidates that are already in the candidate list and have necessary motion information, bi-directional combined motion vector candidates may be derived by a combination of the motion vector of the first candidate referring to a picture in the list 0 and the motion vector of a second candidate referring to a picture in the list 1.

Candidates from different blocks may happen to be the same, which decreases the efficiency of a merge/AMVP candidate list. A pruning process is applied to solve this problem. The pruning process compares one candidate against the others in the current candidate list to avoid inserting identical candidate in certain extent. To reduce the complexity, only limited numbers of pruning process is applied instead of comparing each potential one with all the other existing ones.

Figure 4:
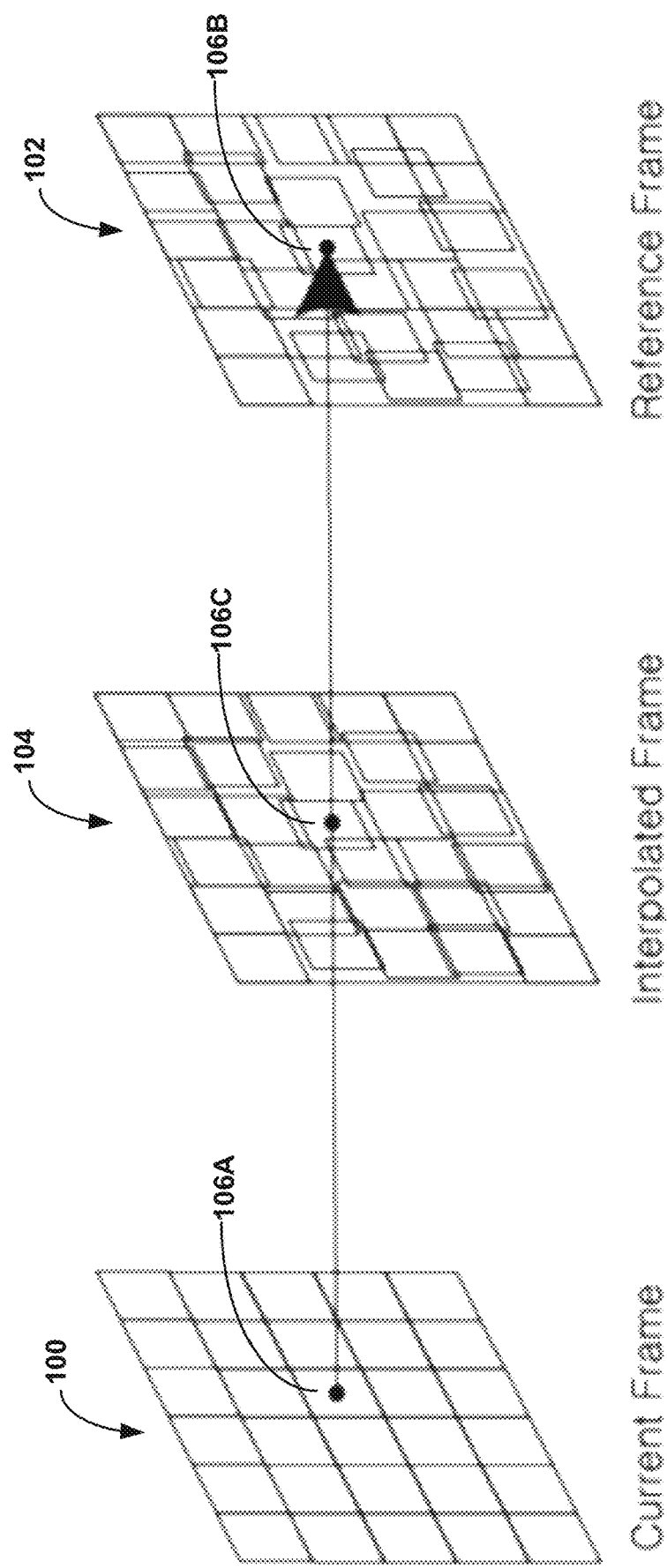
FIG. 4 is a conceptual diagram illustrating unilateral ME in FRUC.

FIG. 4 is a conceptual diagram illustrating an example of unilateral motion estimation (ME) in frame rate up-conversion (FRUC). In particular, FIG. 4 illustrates a current frame 100, a reference frame 102, and an interpolated frame 104. In some instances, a video decoder or post-processing device may interpolate pictures based on one or more reference pictures. The video decoder or post-processing device may interpolate pictures to up-convert an original frame rate of an encoded bitstream. Alternatively, the video decoder or post-processing device may interpolate pictures to insert one or more pictures that were skipped by a video encoder to encode a video sequence at a reduced frame rate. In either case, the video decoder or post-processing device interpolates frames (such as interpolated frame 104) that are not included in an encoded bitstream that has been received by the video decoder using pictures that have been decoded (such as current frame 100 and reference frame 102). The video decoder or post-processing device may interpolate the pictures using any of a number of interpolation techniques, e.g., using motion compensated frame interpolation, frame repeat, or frame averaging.

The above-noted frame interpolation techniques are typically implemented post-loop. For example, a video decoder typically receives and decodes an encoded bitstream to generate a reconstructed representation of a video sequence including current frame 100 and reference frame 102. Following the decoding loop, the video decoder or another post processing device may interpolate pictures to be included with the reconstructed representation including interpolated frame 104. In some instances, the process of interpolating picture may be referred to as frame rate up-conversion (FRUC), because the resulting sequence of pictures includes additional (interpolated) pictures that were not included in the encoded bitstream.

Accordingly, FRUC technology may be used to generate high-frame-rate videos based on low-frame-rate videos. FRUC has been used in display industry. Examples include, for example, X. Chen, J. An, J. Zheng, "EE3: Decoder-Side Motion Vector Refinement Based on Bilateral Template Matching," JVET-E0052, January 2017, W. H. Lee, K. Choi, J. B. Ra, "Frame rate up conversion based on variational image fusion", IEEE transactions on image processing, vol. 23, No. 1, January 2014, and U. S. Kim, M. H. Sunwoo, "New frame rate up-conversion algorithms with low computational complexity", IEEE transactions on circuits and systems for video technology, vol. 24, No. 3, March 2014.

FRUC algorithms may be divided into two types. One type of methods interpolate intermediate frames by simple frame repetition or averaging. However, this method provides improper results in a picture that contains a lot of motion. The other type of technique, called motion-compensated FRUC (MC-FRUC), considers object movement when MC-FRUC generates intermediate frames and consists of two steps: motion estimation (ME) and motion-compensated interpolation (MCI). ME generates motion vectors (MVs), which represent object motion using vectors, whereas MCI uses MVs to generate intermediate frames.

The block-matching algorithm (BMA) is widely used for ME in MC-FRUC as MC-FRUC is simple to implement. BMA divides an image into blocks and detects the movement of those blocks, e.g., to determine whether the blocks correspond. Two kinds of ME are primarily used for BMA: unilateral ME and bilateral ME.

As shown in FIG. 4, unilateral ME obtains MVs by searching the best matching block from reference frame 102 of current frame 100. Then the block on the motion trajectory in the interpolated frame can be located so that the MV is achieved. As shown in FIG. 4, three blocks including 106A, 106B, and 106C from current frame 100, reference frame 102 and interpolated frame 104, respectively, are involved following the motion trajectory. Although block 106A in current frame 100 belongs to a coded block, the best matching block 106B in reference frame 102 may not fully belong to a coded block, and neither does block 106C in interpolated frame 104. Consequently, overlapped regions of the blocks and un-filled (holes) regions may occur in the interpolated frame.

To handle overlaps, simple FRUC algorithms merely involve averaging and overwriting the overlapped pixels. Moreover, holes are covered by the pixel values from a reference or a current frame. However, these algorithms result in blocking artifacts and blurring. Hence, motion field segmentation, successive extrapolation using the discrete Hartley transform, and image inpainting are proposed to handle holes and overlaps without increasing blocking artifacts and blurring.

Figure 5:
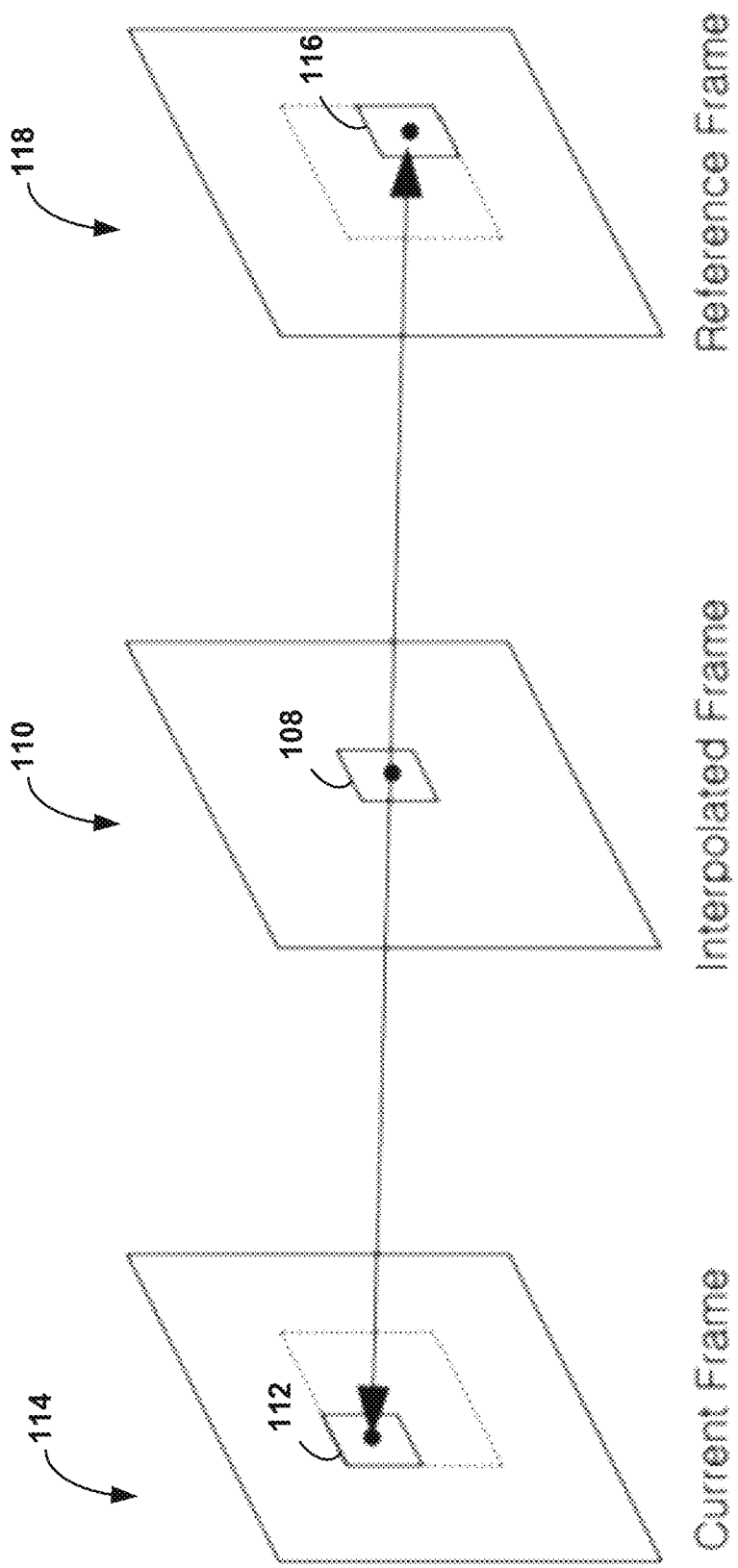
FIG. 5 is a conceptual diagram illustrating bilateral ME in FRUC.

FIG. 5 is a conceptual diagram illustrating an example of bilateral motion estimation (ME) in FRUC. In particular, FIG. 5 illustrates an interpolated block 108 of an interpolated frame 110 that is interpolated from a current block 112 of a current frame 114 and a reference block 116 of a reference frame 118. As shown in FIG. 5, bilateral ME is another solution (in MC-FRUC) that can be used to avoid the problems caused by overlaps and holes shown in FIG. 4. Bilateral ME obtains MVs passing through interpolated block 108 using the temporal symmetry between blocks 112 and 116 of current frame 114 and reference frame 118, respectively. As a result, bilateral ME does not generate overlaps and holes. Since Bilateral ME assumes the current block is a block that is being processed, in a certain order, e.g., as in the case of video coding, a sequence of such blocks would cover the whole intermediate picture without overlap. For example, in the case of video coding, blocks can be processed in the decoding order.

According to aspects of this disclosure, the bilateral motion estimation shown in the example of FIG. 5 may be leveraged to derive motion information. For example, a video coder (such as video encoder 20 or video decoder 30) may apply bilateral matching as a motion information derivation mode to derive motion information during coding. In bilateral matching, the video coder may performing a motion search for a first set of reference data in a first reference picture that corresponds to a second set of reference data in a second reference picture.

According to other aspects of this disclosure, a video coder (such as video encoder 20 and/or video decoder 30) may generate the interpolated frame in the encoding or decoding loop using the bilateral matching technique shown in FIG. 5. For example, the video coder may use picture level FRUC to interpolate the interpolated picture as a predictor of the current picture, using the reconstructed pixel array. In some examples, such an interpolated picture may be considered as a reference picture or the reconstruction of the current picture. In other examples, the video coder may set the current picture equal to the interpolated picture. Such a picture may be marked as a discardable picture and/or non-reference picture by syntax elements or decoding processes.

Figure 6:
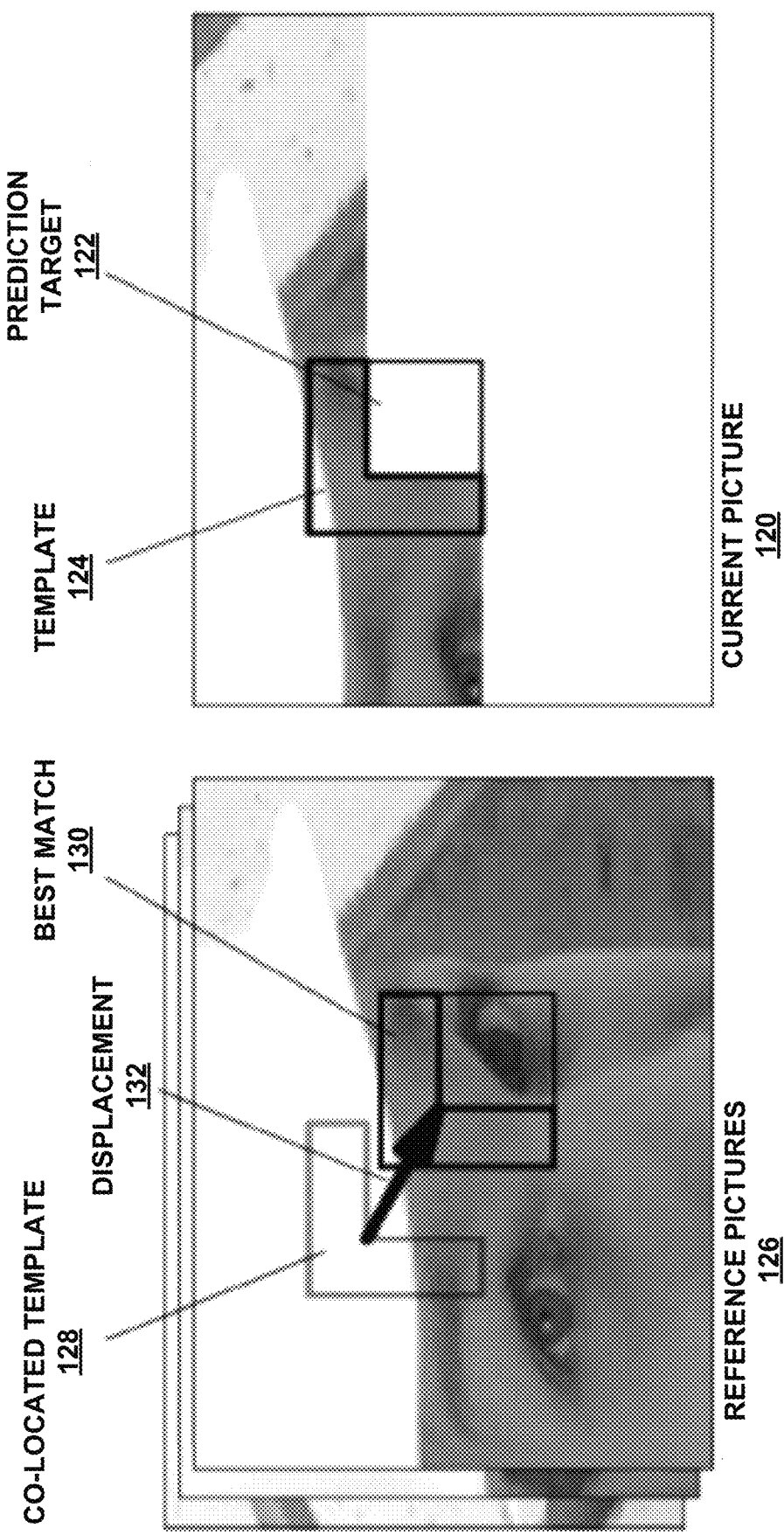
FIG. 6 is a conceptual diagram illustrating template matching based DMVD.

FIG. 6 is a conceptual diagram illustrating an example of template matching based decoder side motion vector derivation (DMVD). With advanced video codecs, the bit percentage of motion information in bitstream becomes more and more. In some instances, DMVD may reduce the bit cost of motion information. Template matching based DMVD may exhibit a coding efficiency improvement, as described, for example, in S. Kamp, M. Wien, "Decoder-side motion vector derivation for block-based video coding", IEEE transactions on circuits and systems for video technology, vol. 22, No. 12, December 2012.

In the example of FIG. 6, a current picture 120 includes a prediction target 122 (e.g., a block currently being coded) and a template 124. Reference pictures 126 include a co-located template 128, a best match 130, and a displacement vector 132. A video coder (such as video encoder 20 and/or video decoder 30) may use template 124 to search for a best match for prediction target 122 (e.g., rather than using the prediction target 122 itself, which is yet to be coded). For example, the video coder may perform a motion search to identify a first set of reference data (e.g., best match 130) that corresponds to a second set of reference data outside of prediction target 122 (e.g., template 124). As noted above, correspondence may be determined based on an amount of similarity between reference data, and may be referred to herein as determining a "match" or "best match."

In the example shown, the video coder may identify co-located template 128 in reference pictures 126. The video coder may then search for best match 130, which includes pixel values that are similar to template 124. The video coder may determine displacement vector 132 based on the displacement of co-located template 128 and best match 130 in reference pictures 126.

Assuming template 124 and prediction target 122 are from the same object, the motion vector of the template can be used as the motion vector of the prediction target. Hence, in the example of FIG. 8, the video coder may apply displacement vector 132 to prediction target 122. Since the template matching is conducted at both a video encoder and a video decoder, the motion vector can be derived at decoder side to avoid signaling cost.

According to aspects of this disclosure, the video coder may apply template matching as a motion information derivation mode. For example, the video coder may apply template matching to derive motion information of a current block by locating a best match between template 124 of current picture and corresponding reference data in reference pictures 126. While the example of FIG. 6 illustrates template 124 as an L-shaped block of video data, it should be understood that other templates may be used. For example, the video coder may use multiple blocks as a template, e.g., one or more blocks positioned to the left of prediction target 122 and one or more blocks positioned above prediction target 122.

According to aspects of this disclosure, the video coder may apply the template matching techniques shown in FIG. 6 using one or more motion vectors from a candidate list of motion vectors. For example, the video coder may be configured to determine one or more candidate motion vectors using any combination of techniques described herein (e.g., merge mode candidates, AMVP candidates, a TMVP, or the like). The video coder may then be configured to apply one or more of the candidate motion vectors to template 124 to locate co-located template 128 (in this example, the location of co-located template 128 is dictated by the one or more candidate motion vectors and not necessarily strictly co-located). The video coder may be configured to determine which of the candidate motion vectors results in a best match between template 124 and co-located template 128.

According to aspects of this disclosure, the video coder may then be configured to refine the candidate motion vector to derive motion information for prediction target 122. For example, the video coder may search for a best match for template 124 in a region of reference pictures 126 identified by the candidate motion vector. Upon determining a best match, the video coder may determine a displacement between template 124 and the determined based match. The video coder may designate the displacement as a derived motion vector for prediction target 122.

Figure 7:
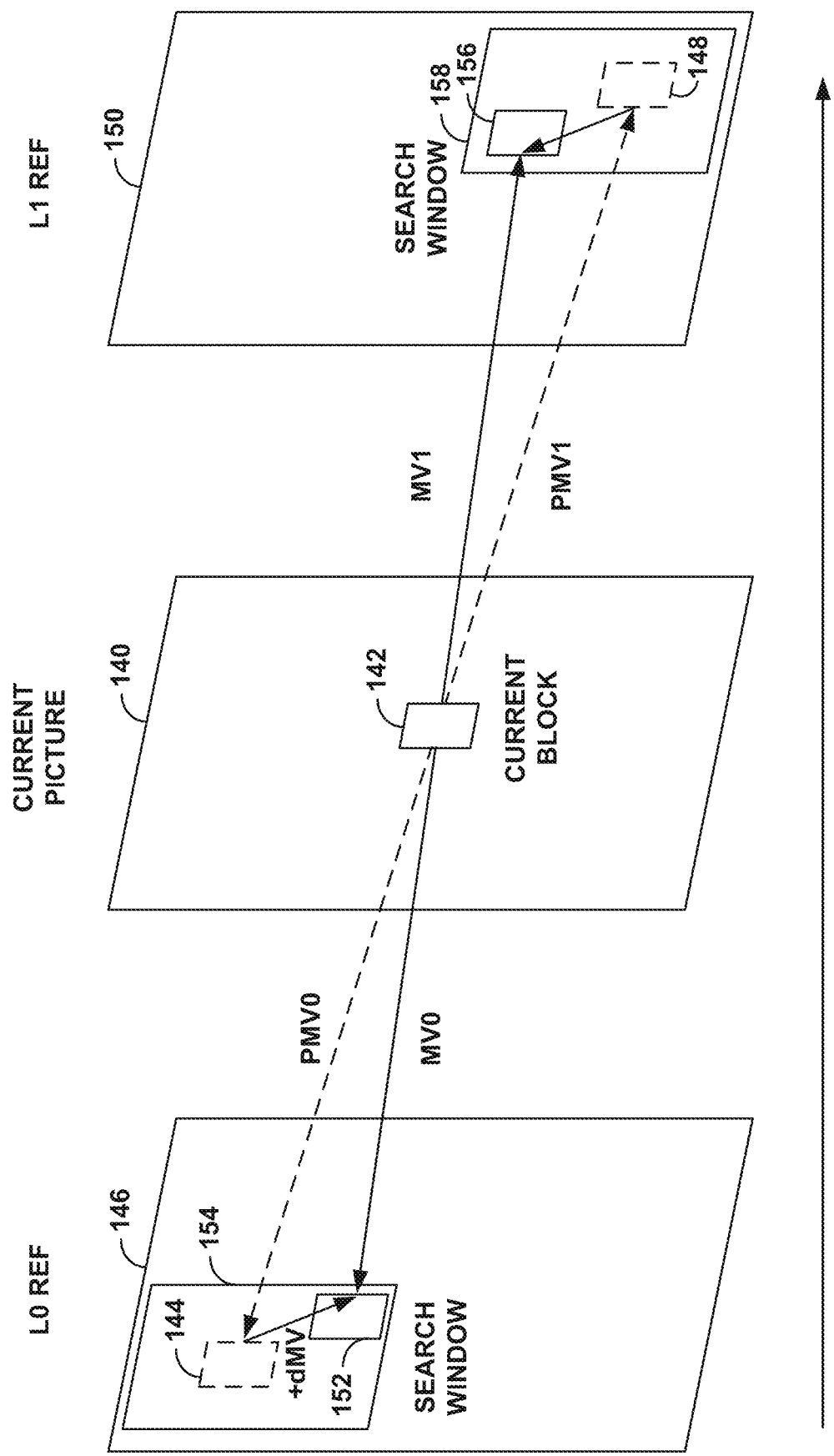
FIG. 7 is a conceptual diagram illustrating mirror based bi-directional MV derivation in DMVD.

FIG. 7 is a conceptual diagram illustrating an example of bidirectional motion vector derivation in DMVD. Another category of DMVD is mirror based bidirectional MV derivation, as described, for example, in Y.-J. Chiu, L. Xu, W. Zhang, H. Jiang, "Decoder-side Motion Estimation and Wiener filter for HEVC", Visual communications and Image Processing (VCIP), 2013. The concept of bidirectional motion vector derivation in DMVD may be akin to bilateral ME in FRUC. For example, mirror-based MV derivation may be applied by centro-symmetric motion estimation around search centers in fractional sample accuracy.

The example of FIG. 7 includes current picture 140 having current block 142 (the block currently being coded), a first candidate motion vector PMV0 that identifies a first template block 144 of a first reference picture 146 (L0 ref), and a second candidate motion vector PMV1 that identifies a second template block 148 of a second reference picture 150. The video coder may apply dMV as an offset to locate a first reference block 152 in search window 154 of first reference picture 146 and to locate a second reference block 156 in search window 158 of second reference picture 150.

For example, the video coder may add dMV to PMV0 and subtract dMV from PMV1 to generate an MV pair, MV0 and MV1. The video coder may check all values of dMV inside search window 154 and 158 to determine which value of dMV results in the best match between first reference block 152 (e.g., a first set of reference data) of L0 ref and second reference block 156 (e.g., a second set of reference data) of L1 ref. In some examples, the video coder may determine the best match based on the Sum of Absolute Difference (SAD). In other examples, the video coder may use another metric to determine the best match. The size and location of search windows 154 and 158 may be pre-defined or may be signaled in a bitstream.

The video coder may select the MV pair with the minimum SAD as the output of Centro-symmetric motion estimation. Since this technique uses a future reference (reference at a temporal position later than the current frame) and an earlier reference (reference at a temporal position earlier than the current frame) for the SAD matching, selecting the MV pair with the minimum SAD cannot be applied to P frame or low-delay B frames in which only former reference is available.

According to aspects of this disclosure, the video coder may apply the bidirectional motion vector derivation techniques as a motion information derivation mode. In some examples, the video coder may apply the techniques shown in FIG. 7 using one or more motion vectors from a candidate list of motion vectors. For example, the video coder may be configured to determine one or more candidate motion vectors using any combination of techniques described herein (e.g., merge mode candidates, AMVP candidates, a TMVP, or the like). The video coder may then be configured to apply one or more of the candidate motion vectors as PMV0 and/or PMV1 to locate first template block 144 and second template block 148. The video coder may be configured to determine which of the candidate motion vectors results in a best match between first template block 144 and second template block 148.

According to aspects of this disclosure, the video coder may then be configured to refine the candidate motion vector to derive motion information for current block 142. For example, the video coder may search for a best match by applying a variety of values of dMV, in the manner described above. In this way, the video coder may derive MV pair MV0 and MV1.

Figure 8A:
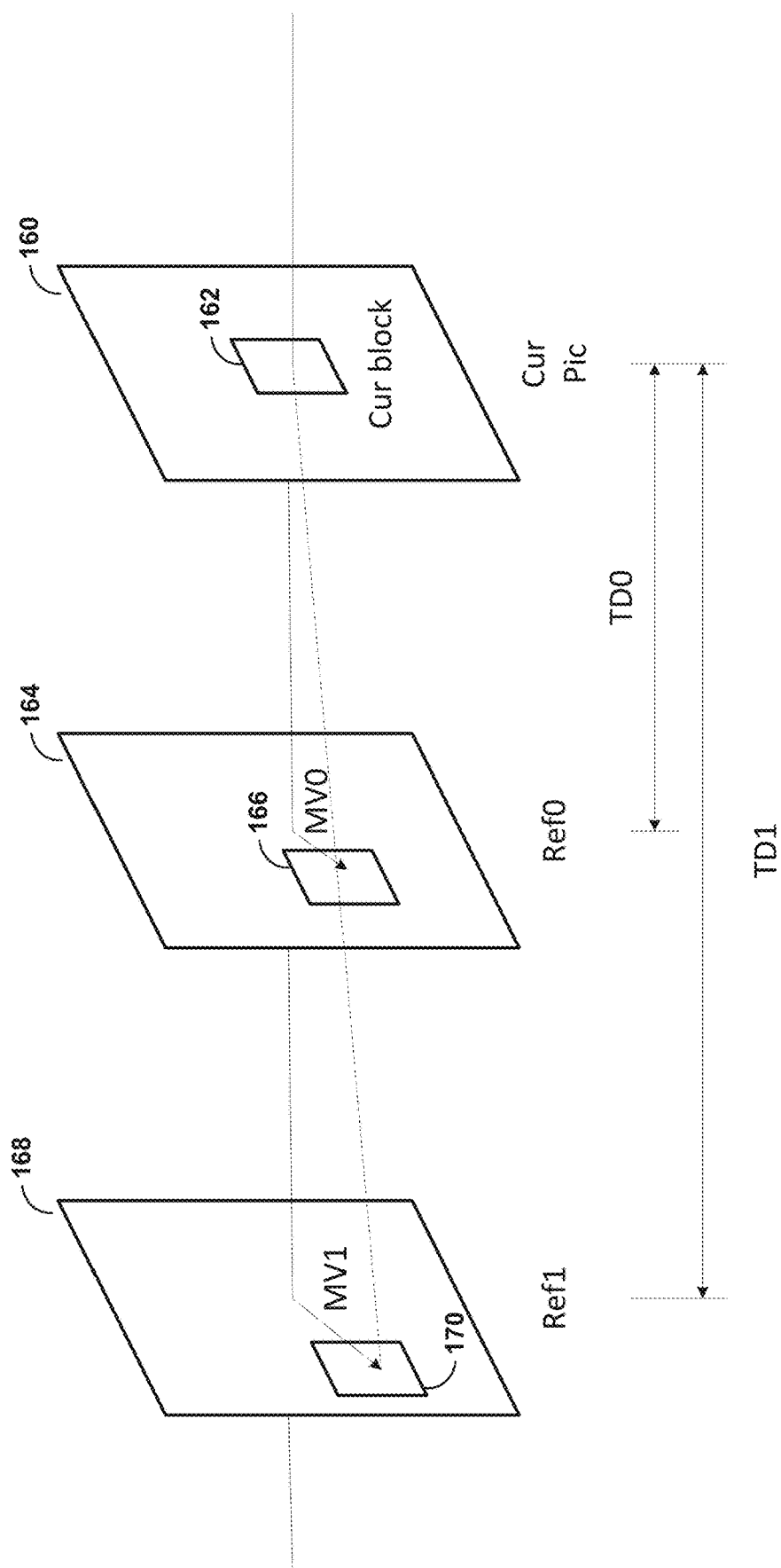
FIG. 8A is a conceptual diagram illustrating extended bilateral matching based motion vector derivation.

FIG. 8A is a conceptual diagram illustrating extended bilateral matching based motion vector derivation. One potential drawback of mirror based bidirectional MV derivation (e.g., as shown in FIG. 7) is that mirror based bidirectional MV derivation does not work when two references of the current picture are both earlier or both later than the current picture. The extended bilateral matching techniques described herein may, in some instances, overcome the drawback that all reference pictures of the current picture are in the same side (in display order) as the current picture.

The example of FIG. 8A includes a current picture 160 including a current block 162, a first reference picture (Ref0) 164 including a first reference block 166, and a second reference picture (Ref1) 168 including a second reference block 170. As shown in FIG. 8A, first reference picture (Ref0) 164 and second reference picture (Ref1) 168 are both located before the current picture in the temporal direction. Assuming that first reference block 166, second reference block 170, and current block 162 are along the same motion trajectory, the ratio between MV0 and MV1 shall be equal to the ratio between the temporal distance TD0 and TD1. In other words, given two references Ref0 and Ref1 with temporal distance TD0 and TD1 to the current picture, for any MV0 in Ref0, MV1 in Ref1 may be determined scaling MV0.

The video coder may select the final MV0 and MV1 pair as the pair that minimizes the matching cost between the block pair pointed by MV0 and MV1. Theoretically, current block 162 may be regarded as an extrapolated block based on first reference block 166 and second reference block 170. It should be noted that the extended bilateral matching also works in a bidirectional case in which the current picture is temporally between the two references. In this case, current block 162 may be regarded as an interpolated block based on first reference block 166 and second reference block 170. Moreover, the bilateral matching techniques described herein do not require "mirror relationship" between MV0 and MV1, even in bidirectional case. The assumption of bilateral matching is that the ratio between MV0 and MV1 is in proportion to the ratio between the temporal distance from Ref0 to the current picture and that from Ref1 to the current picture.

Clearly, for reference blocks other than first reference block 166 and second reference block 170, the video coder may derive a different MV pair. In one example, the video decoder may select reference pictures for performing bilateral matching according to an order in which the reference pictures appear in a reference picture list. For example, the video coder may select the first reference in reference list 0 as Ref0 and the first reference in reference list 1 as Ref1. The video coder may then search the MV pair (MV0, MV1). In another example, the video coder selects Ref0 based on an entry in an initial list (e.g., an initial motion vector candidate list). The video coder may then set Ref1 to a reference picture in the other reference picture list that is temporally closest to the current picture. Consequently, the video coder may search the MV pair (MV0, MV1) in Ref0 and Ref1.

Hence, according to aspects of this disclosure, the video coder may apply the extended bidirectional motion derivation techniques illustrated in FIG. 8A as a motion information derivation mode. For example, the video coder may use the bilateral matching to derive motion information of current block 162 by finding the best match between two blocks (e.g., such as first reference block 166 and second reference block 170) along the motion trajectory of the current block in two different reference pictures. Under the assumption of continuous motion trajectory, the motion vectors MV0 and MV1 pointing to the two reference blocks first reference block 166 and second reference block 170 shall be proportional to the temporal distances, i.e., TD0 and TD1, between the current picture and the two reference pictures. As a special case, when current picture 160 is temporally between two reference pictures (as shown in the example of FIG. 7) and the temporal distance from current picture to the two reference pictures is the same, the bilateral matching becomes mirror based bidirectional MV.

Figure 8B:
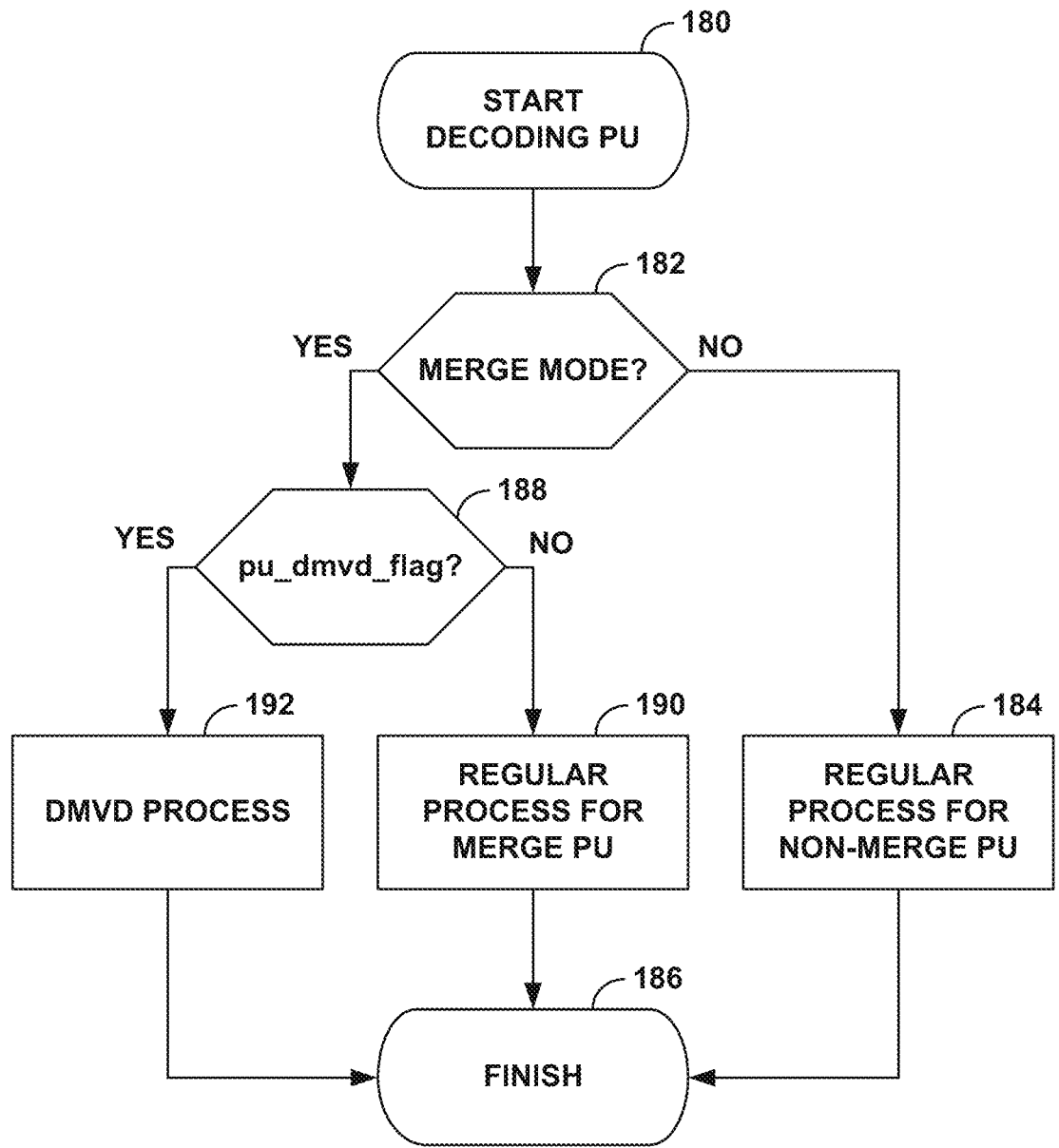
FIG. 8B is a block diagram illustrating PU decoding with pu_dmvd_flag added.

FIG. 8B is a flowchart illustrating an example of decoding a prediction unit (PU) using DMVD. In Y.-J. Chiu, L. Xu, W. Zhang, H. Jiang, "Decoder-side Motion Estimation and Wiener filter for HEVC", Visual communications and Image Processing (VCIP), 2013, it was further proposed to combine the mirror based bidirectional MV derivation with merge mode in HEVC. In the proposed technique, a flag called pu_dmvd_flag is added for a PU of B slices to indicate if a DMVD mode is applied to the current PU. Because the DMVD mode does not explicitly transmit any MV information in the bitstream, the pu_dmvd_flag syntax element is integrated with the syntax of merge mode in HEVC (which uses an index for data representative of a motion vector rather than the motion vector itself).

In the example of FIG. 8B, a video decoder (such as video decoder 30) may start decoding a PU (180). Video decoder 30 may determine whether the mode used to decode the PU is merge mode (182), e.g., based on syntax included in a bitstream that includes the PU. If merge mode is not used (the "no" branch of step 182), video decoder 30 may use a regular process for a non-merge PU to decode the PU (184) and finish the process (186).

If the merge mode is used (the "yes" branch of step 182), video decoder 30 may determine whether DMVD is used to determine motion information for the PU based on the value of the pu_dmvd_flag syntax element (188). If DMVD is not used (the "no" branch of step 188), video decoder 30 may use a regular merge mode to decode the PU (190) and finish the process (186). If DMVD is used (the "yes" branch of step 188), video decoder 30 may apply a DMVD process to determine the motion information for the PU (192) and finish the process (186).

To find motion vector of a block, fast motion search methods are used in many practical video codecs. There are many fast motion search method proposed in the literature, such as Block-Based Gradient Descent Search (BBGDS) as described in Lurng-Kuo Liu, Ephraim Feig, "A block-based gradient descent search algorithm for block motion estimation in video coding," IEEE Trans. Circuits Syst. Video Technol; vol. 6, pp. 419-422, August 1996, Unrestricted Center-Biased Diamond Search (UCBDS) as described in Jo Yew Tham, Surendra Ranganath, Maitreya Ranganath, and Ashraf Ali Kassim, "A novel unrestricted center-biased diamond search algorithm for block motion estimation," IEEE Trans. Circuits Syst. Video Technol., vol. 8, pp. 369-377, August 1998, HEXagon-Based Search (HEBS) as described in Ce Zhu, Xiao Lin, and Lap-Pui Chau, "Hexagon-Based Search Pattern for Fast Block Motion Estimation," IEEE Trans. Circuits Syst. Video Technol., vol. 12, pp. 349-355, May 2002. Basically, these techniques only search a certain number of positions inside a searching window based on predefined search patterns. These techniques normally work well when motion is small and moderate.

Figure 9:
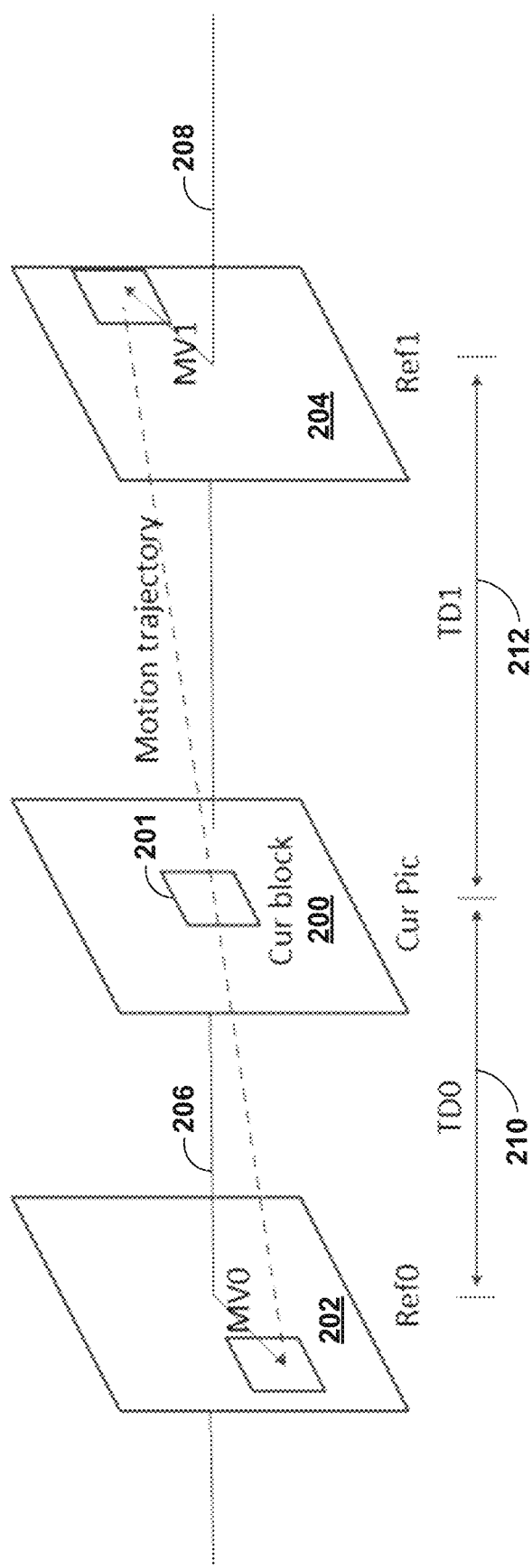
FIG. 9 is a conceptual diagram illustrating bilateral matching.

FIG. 9 is a conceptual diagram illustrating an example of bilateral matching. In U.S. Patent Application Publication 2016/0286229, a coding method was proposed based on frame rate up-conversion method, e.g. FRUC mode. Generally, FRUC mode is a special merge mode, with which motion information of a block is not signaled but derived at decoder side.

Video encoder 20 may signal a FRUC flag for a CU when its merge flag is true. When the FRUC flag is false, video encoder 20 may signal a merge index and use the regular merge mode. When the FRUC flag is true, video encoder 20 may signal an additional FRUC mode flag to indicate which method (bilateral matching or template matching) is to be used to derive motion information for the block.

During the motion derivation process, video encoder 20 and/or video decoder 30 may derive an initial motion vector (e.g., seeding motion vector, starting motion vector information, etc.) for the whole CU based on bilateral matching or template matching. In this example, video encoder 20 and/or video decoder 30 may check the merge list of the CU and selects the candidate which leads to the minimum matching cost as the starting point. In this example, video encoder 20 and/or video decoder 30 performs a local search based on bilateral matching or template matching around the starting point and takes the MV that results in the minimum matching cost as the MV for the whole CU. Subsequently, video encoder 20 and/or video decoder 30 may further refine the motion information at a sub-block level with the derived CU motion vectors as the starting points.

In the example of FIG. 9, video encoder 20 and/or video decoder 30 may use bilateral matching to derive motion information of the current block 201 by finding the best match between two blocks along the motion trajectory of the current block in two different reference pictures. For example, video encoder 20 and/or video decoder 30 may find the best match between a first input reference block 202 of Ref0 and a second input reference block 204 along the motion trajectory of the current block 201.

Under the assumption of continuous motion trajectory, the motion vectors MV0 206 and MV1 208 pointing to the first input reference block 202 and the second input reference block 204, respectively, shall be proportional to the temporal distances, i.e., TD0 210 and TD1 212, between the current picture 200 and the first input reference block 202 and the second input reference block 204. As a special case, when the current picture 200 is temporally between the two reference pictures and the temporal distance from the current picture to the first input reference block 202 and the second input reference block 204 are the same, the bilateral matching becomes mirror based bi-directional MV.

Figure 10:
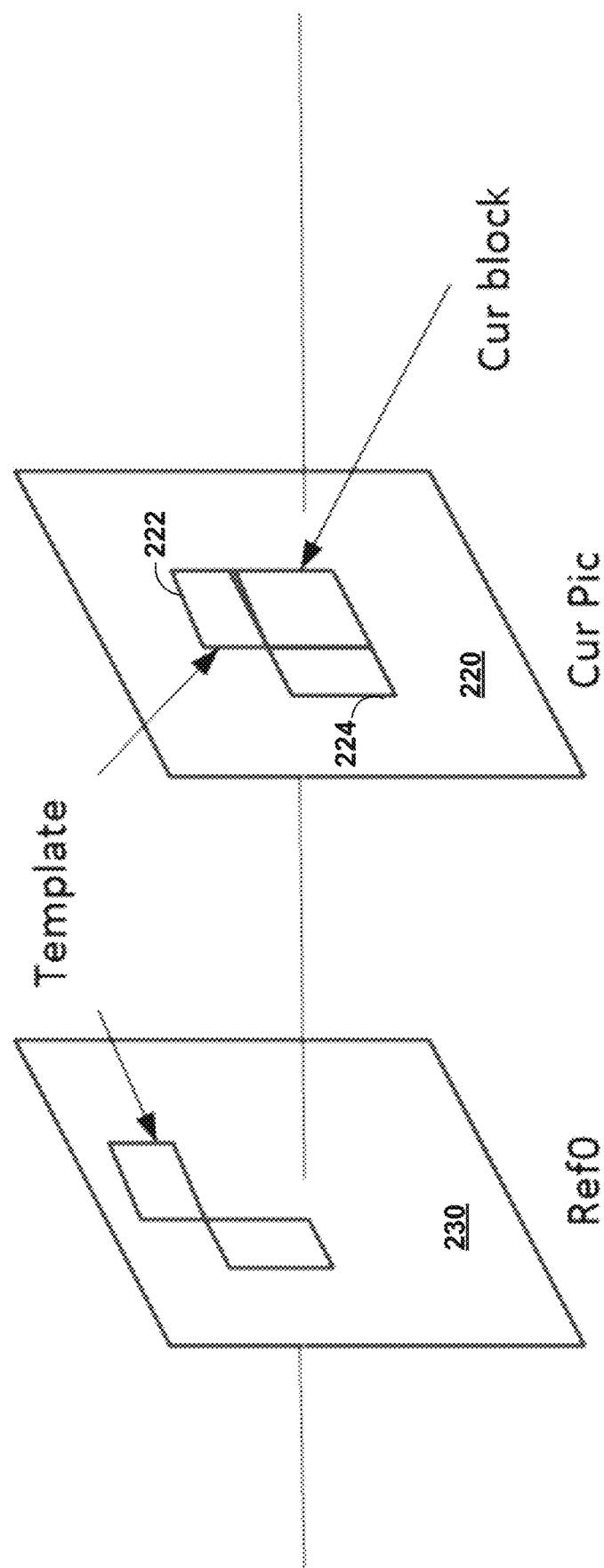
FIG. 10 is a conceptual diagram illustrating template matching.

FIG. 10 is a conceptual diagram illustrating an example of template matching. In the example of FIG. 10, video encoder 20 and/or video decoder 30 may use template matching to derive motion information of current block 220 by finding the best match between a template (e.g., top neighbouring block 222 and/or left neighbouring block 224 of current block 220) in current picture 220 and a block (same size to the template) in a reference picture 230.

At the encoder side, video encoder 20 may make a decision on whether to use FRUC merge mode for a CU based on RD cost selection as done for normal merge candidate. That is, video encoder 20 may check the two matching modes (e.g., bilateral matching and template matching) for a CU by using RD cost selection. Video encoder 20 may compare the one leading to the minimal cost (e.g., bilateral matching and template matching) to other CU modes. If a FRUC matching mode is the most efficient one, video encoder 20 may set a FRUC flag to true for the CU and use the related matching mode.

Figure 11:
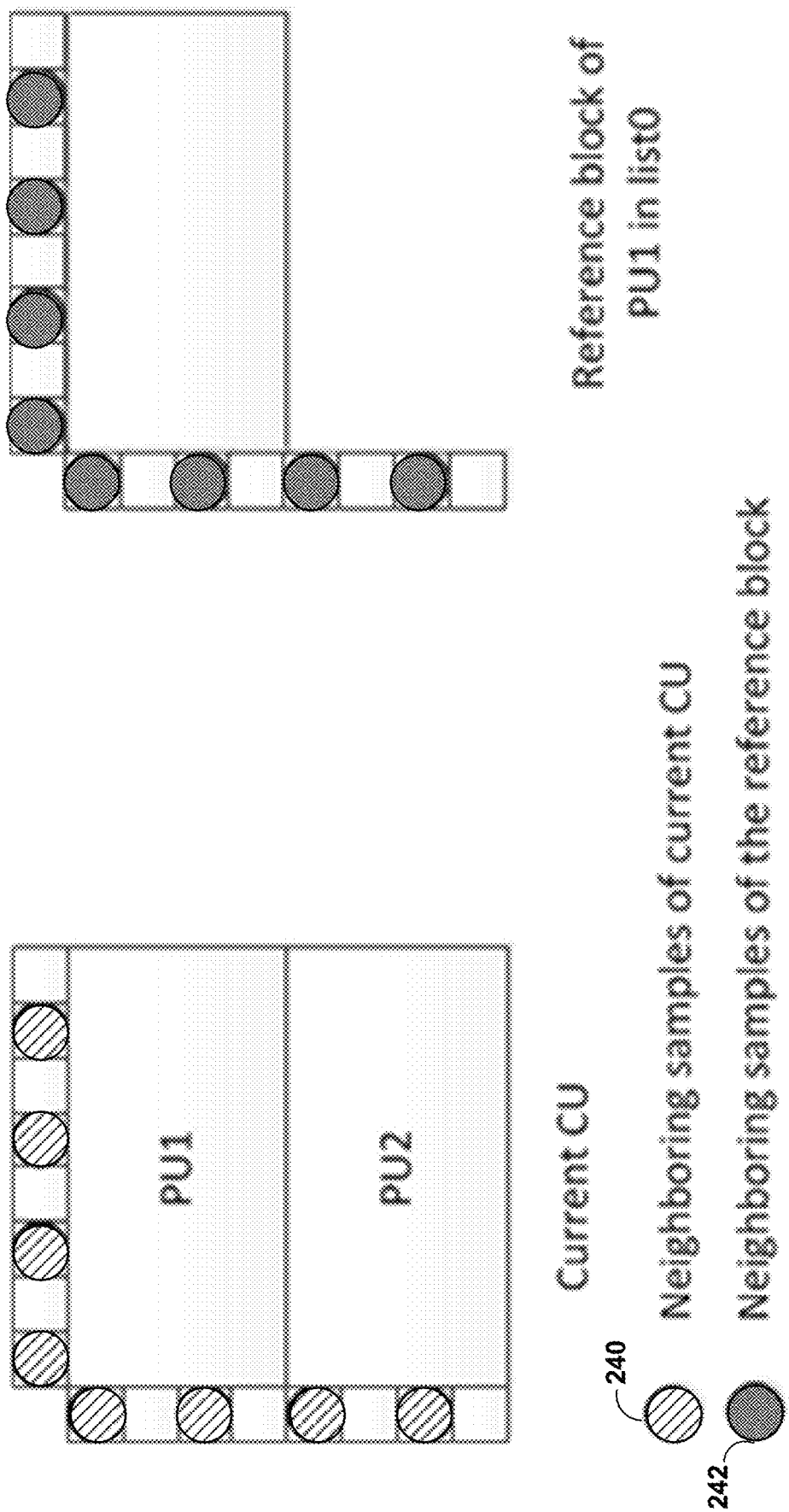
FIG. 11 is a conceptual diagram illustrating neighboring samples used for deriving IC parameters.

FIG. 11 is a conceptual diagram illustrating neighboring samples used for deriving IC parameters. Local Illumination Compensation (LIC) is based on a linear model for illumination changes, using a scaling factor a and an offset b. And LIC may be enabled or disabled adaptively for each inter-mode coded coding unit (CU).

When LIC applies for a CU, a least square error method is employed to derive the parameters a and b by using the neighboring samples 240 of the current CU and their corresponding reference samples 242. More specifically, as illustrated in FIG. 11, the subsampled (2:1 subsampling) neighboring samples 240 of the CU and the corresponding pixels (identified by motion information of the current CU or sub-CU) in the reference picture are used. The IC parameters are derived and applied for each prediction direction separately.

When a CU is coded with merge mode, the LIC flag is copied from neighboring blocks, in a way similar to motion information copy in merge mode; otherwise, an LIC flag is signaled for the CU to indicate whether LIC applies or not.

Figure 12:
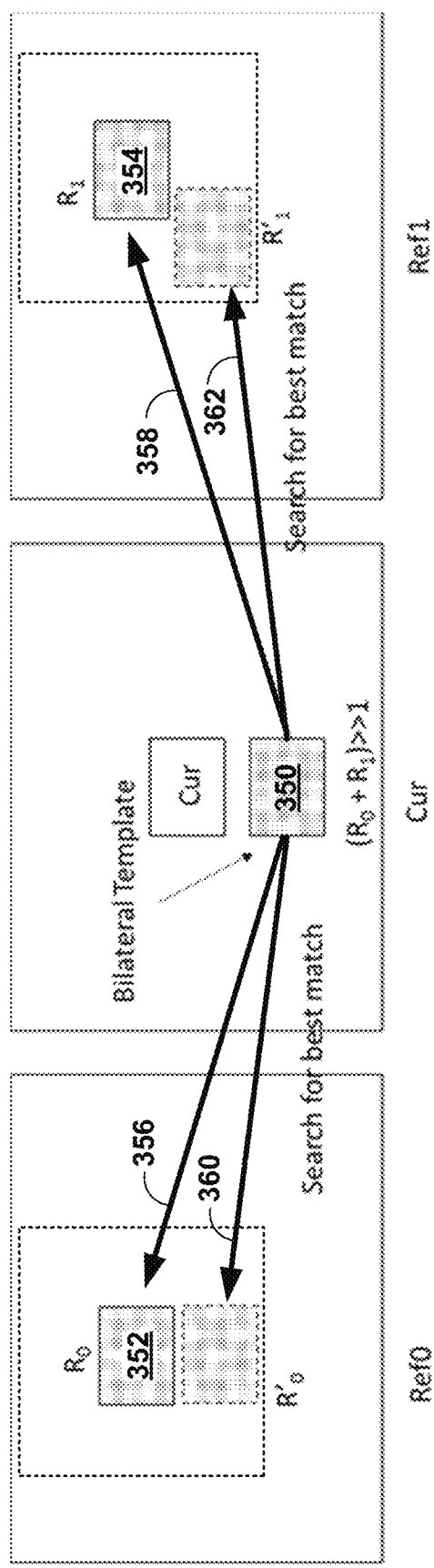
FIG. 12 is a conceptual diagram illustrating DMVD based on bilateral template matching.

FIG. 12 is a conceptual diagram illustrating an example of decoder-side motion derivation based on bilateral template matching. In Chen, J. An, J. Zheng, "EE3: Decoder-Side Motion Vector Refinement Based on Bilateral Template Matching," JVET-E0052, January 2017, a decoder side motion derivation method was proposed based a bilateral template matching. Video encoder 20 and/or video decoder 30 may generate a bilateral template 350 as a weighted combination of the two prediction blocks, from the initial $MV_0$ of list0 and $MV_1$ of list1 respectively, as shown in FIG. 12. For example, video encoder 20 and/or video decoder 30 may generate a bilateral template 350 for a pixel 'n', also referred to herein as simply "$T_n$,", as a weighted combination of first input reference block for the pixel 'n' (referred to herein as simply "$R_{0,n}$") 352 and second input reference block 354 for the pixel 'n' (referred to herein as simply "$R_{1,n}$") from the initial $MV_0$ 356 of list0 and $MV_1$ 358 of list1 respectively.

The template matching operation may include calculating cost measures between the generated template $T_n=(R_{0,n}+R_{1,n})/2$ and the sample region (around the initial prediction block) in the reference picture. For each of the two reference pictures, the MV that yields the minimum template cost is considered as the updated MV of that list to replace the original one, i.e., $$MV_0'=\arg\min\{R_{0,n}'-T_n\} \quad (1)$$

$$MV_1'=\arg\min\{R_{1,n}'-T_n\} \quad (2)$$

Video encoder 20 and/or video decoder 30 may use the two new MVs, e.g., $MV_0'$ 360 and $MV_1'$ 362 as shown in FIG. 12, for regular bi-prediction. In some examples, video encoder 20 and/or video decoder 30 may use the sum of absolute differences (SAD) as cost measure.

Video encoder 20 and/or video decoder 30 may apply DMVD for merge mode of bi-prediction with one from the reference picture in the past and the other from reference picture in the future, without the transmission of an additional syntax element. In JEM4.0, when LIC, affine, sub-CU merge candidate or FRUC is selected for one CU, the technique is not applied.

The multiple seeding nature of FRUC potentially may use an increased amount of reference samples from external memory to perform search. For example, video encoder 20 and/or video decoder 30 adding a bi-predicted motion vector information to the candidate list of motion vector information corresponding to the uni-predicted motion vector may increase an amount of reference samples. In some cases, all the seeding motion vectors (e.g., starting motion vector information in a candidate list of motion vector information) may fall into disjoint regions in a reference frame, and hence video encoder 20 and/or video decoder 30 may fetch all the reference samples to perform the FRUC search to find the best motion vector. This potentially increased amount of reference samples may increase the chance of cache misses and hence, may result in an issue of higher latency in some implementations.

This disclosure describes techniques that potentially addresses the following complexity issues in existing FRUC design. In a first example, in existing FRUC search, a video coder may derive a set of seeding motion vectors (e.g., starting motion vector information in a candidate list of motion vector information) and search in their surrounding area. This can potentially increase bandwidth requirement in the worst-case scenario. In a second example, bi-lateral template matching introduces an alternative way of motion refinement for the regular merge mode and brings coding efficiency, while the scheme requires additional buffer for bi-lateral template for motion refinement, which is inconsistent with other motion refinement methods and incurs additional complexity. In a third example, in existing FRUC design, a decoder-side motion search is followed by a sub-block refinement where each sub-block (e.g., 4×4 sub-block) may have distinct seeding motion vectors which point to disjoint region of the reference frame. The disjoint search range covered by each of the seeding motion vectors may increase the bandwidth requirement as well as computational complexity while obtaining 0.4%-1.1% coding gain.

To address the foregoing, several techniques are proposed as follows.

The following itemized techniques may be applied individually. Alternatively, any combination of these techniques may be applied. Please note that reference index information may be regarded as a part of motion information, sometimes reference index information and motion information are jointly referred to herein as a set of motion information.

In a first technique, for FRUC template matching, or bilateral matching, or both, video encoder 20 constructs a list of seeding motion vectors, and the starting (seeding) MV is signalled instead of being derived. Said differently, for example, video encoder 20 and/or video decoder 30 may construct a candidate list of motion vector information for a portion of a current frame. Video encoder 20 and/or video decoder 30 may only search around the starting MV. The portion of the current frame may correspond to a current block of the current frame, a current coding unit for the current frame, or a plurality of coding units for the current frame.

Video encoder 20 may signal the starting MV to video decoder 30. For example, video encoder 20 may signal the starting (seeding) MV in a block level. Said differently, for example, video encoder 20 may output an indication of the residual sample values and signaling information indicating the starting motion vector information of the candidate list of motion vector information. In some examples, video decoder 30 may receive signaling information indicating starting motion vector information of the candidate list of motion vector information, the starting motion vector information indicating an initial position in a reference frame. In some examples, video encoder 20 may signal the starting MV for each coding unit. In some examples, video encoder 20 may signal the starting MV in a higher-level (e.g., a larger region covering multiple coding units). In this example, for each coding unit within a region, video decoder 30 may search a small range around the signaled MV. In some examples, video encoder 20 may signal an index or a flag to indicate the starting (seeding) MV, from the constructed list of seeding MVs.

For the construction of initial candidate list of seeding motion vectors, video encoder 20 and/or video decoder 30 may apply a pruning process. For example, the pruning may be based on the current block size and the precision of the motion vectors to be used. Said differently, for example, video encoder 20 and/or video decoder 30 may prune first candidate motion vector information from an initial candidate list of motion vector information based on a size of the current block and/or a motion vector precision for refined motion vector information to generate the candidate list of motion vector information. In some examples, to prune, video encoder 20 and/or video decoder 30 may: (1) remove a merge candidate from a candidate list of motion vector information; or (2) omit refinement of the merge candidate. To prune, video encoder 20 and/or video decoder 30 may determine a motion vector precision (e.g., pixel precision) for refined motion vector information.

In some examples, video encoder 20 and/or video decoder 30 may prune based on the similarity of motion vectors in the list. Said differently, for example, video encoder 20 and/or video decoder 30 may prune first candidate motion vector information from an initial candidate list of motion vector information based on a similarity between the first candidate motion vector information and a second candidate motion vector information of the initial candidate list of motion vector information to generate the candidate list of motion vector information. In some examples, to prune, video encoder 20 and/or video decoder 30 may determine a motion vector precision for second candidate motion vector information of the candidate list of motion vector information based on a similarity between the first candidate motion vector information and the second candidate motion vector information.

The similarity may be based on the distance between motion vectors. In some examples, video encoder 20 and/or video decoder 30 may use the following rule equation:

$$mvd_{th} = 4 \gg mV_{precision}$$

$$\text{if}(W \cdot H < 64) ==> mvd_{th} = 4 \ll (mv_{precision} - 2)$$

$$\text{else if}(W \cdot H < 256) ==> mvd_{th} = 4 \ll (mV_{precision} - 1) \quad (3)$$

where W and H are the width and height of the block, respectively, and the $mv_{precision}$ represents the precision of the motion vector (e.g., 1/16 pixel precision as used in JEM, and hence the value of $mv_{precision}$ may be 4). For a new candidate, if the absolute values of the horizontal and vertical motion vectors are both less than the mvd$_{th}$ of any of the previous (in the order of list construction of seeding motion vectors) candidate, video encoder 20 and/or video decoder 30 may not add the new candidate into the candidate list. In some examples, video encoder 20 and/or video decoder 30 may send the threshold values via the syntax elements of sequence parameter set (SPS), Picture Parameter Set (PPS), or a slice. Threshold values may include the threshold for block sizes, thresholds for pixel offset (e.g., 4 pixels in equation. (3)), and the MV precision.

During the derivation of FRUC TM seeding motion vectors, video encoder 20 and/or video decoder 30 may use a uni-prediction to bi-prediction technique. In B slices, if any of the derived candidate is predicted from either L0 or L1 only, video encoder 20 and/or video decoder 30 may artificially create a paired, opposite-signed motion vector as the motion vector of the other list, and add the candidate to the candidate list with bi-predicted motion vectors. Said differently, for example, video encoder 20 and/or video decoder 30 may in response to determining that the portion of the current frame corresponds to a B-slice and a uni-predicted motion vector information is to be included in the candidate list of motion vector information, add a bi-predicted motion vector information to the candidate list of motion vector information corresponding to the uni-predicted motion vector. For instance, video encoder 20 and/or video decoder 30 may generate bi-predicted motion vector information to indicate the first motion vector (e.g., predicted from either L0 or L1 only) and a second motion vector corresponding to the first motion vector with an opposite sign. In some examples, video encoder 20 and/or video decoder 30 may denote the motion vector of L0 as MV0 and L1 motion vector is unavailable, and may set an artificial L1 motion vector L1' to −MV0 with reference index set to 0, and vice versa.

Video encoder 20 and/or video decoder 30 may create the unavailable motion vector based on the relative temporal distance to the current frame. For instance, video encoder 20 and/or video decoder 30 may denote the motion vector of L0 as MV0 and a temporal distance of the motion vector of L0 to the current frame as POC0 and the temporal distance of the reference frame in L1, reference index 0 to the current frame is POC1. The artificial motion vector for L1 can be written as:

$$MV1 = \frac{POC0}{POC1} MV0 \quad (4)$$

Instead of always using reference index 0 for the unavailable reference list (List0/List1), video encoder 20 and/or video decoder 30 may select the index value based on the average QP values of the pictures in the unavailable list. Video encoder 20 and/or video decoder 30 may use the picture associated with the lowest average QP values as the reference index. Alternatively, or additionally, video encoder 20 and/or video decoder 30 may select the index value with the smallest POC difference, or the smallest temporal layer index. Alternatively, or additionally, video encoder 20 may signal the reference index in a slice header, PPS, SPS, or block-level.

Video encoder 20 may determine the number of candidates to be signaled at the slice-level. Alternatively, or additionally, the signaling of number of candidates may be mode dependent. For example, the signaling of the IC and non-IC cases can be distinct. This includes, but is not limited to, the number of FRUC TM seeding candidates when IC is enabled is 2, and the number of candidates FRUC TM, non-IC case is 4.

In a second technique, video encoder 20 and/or video decoder 30 may use the FRUC bilateral matching to perform the motion refinement done by bilateral template matching. That is, for example, video encoder 20 and/or video decoder 30 may refine, based on one or more of bilateral matching or template matching, the starting motion vector information to determine refined motion vector information indicating a refined position in the reference frame that is within a search range from the initial position. More specifically, for example, video encoder 20 and/or video decoder 30 may refine the motion trajectory based on a matching difference between the first initial position and the second initial position. Video encoder 20 and/or video decoder 30 may move the original FRUC bilateral matching from as a separate FRUC mode to the motion vector refinement of the regular merge mode.

Instead of creating the bilateral template and performing motion refinement as described in Bilateral Template matching, for example, X. Chen, J. An, J. Zheng, "EE3: Decoder-Side Motion Vector Refinement Based on Bilateral Template Matching," JVET-E0052, January 2017, video encoder 20 and/or video decoder 30 may use the bilateral matching as described in US Patent Publication No. US-2016-0286230. Note that as the scheme illustrated in FIG. 9, video encoder 20 and/or video decoder 30 may perform the search between a region in Ref0 and a region in Ref1. The search range of the motion refinement may be set to 8, while the search range may be signaled via a higher-level syntax element. Video encoder 20 and/or video decoder 30 may use integer-pel searches that are performed iteratively until no further update or reaches the boundary of the search range, followed by half-pel searches using the same stopping criterion.

Video encoder 20 and/or video decoder 30 may perform the bilateral-based refinement in a mirrored fashion. That is, for example, during the search of the refinement motion vectors, video encoder 20 and/or video decoder 30 may employ a paired, opposite-signed motion vector refinement to perform the search. Said differently, for example, video encoder 20 and/or video decoder 30 may modify a first motion vector of the motion vector trajectory that specifies the first initial position by a motion vector refinement and modify a second motion vector of the motion vector trajectory that specifies the second initial position by the motion vector refinement with an opposite sign.

Video encoder 20 and/or video decoder 30 may define the two regions in a mirrored fashion including the temporal distance. That is, for example, video encoder 20 and/or video decoder 30 may consider the temporal distance between the Ref0, Ref1, and the current frame and video encoder 20 and/or video decoder 30 may perform scaling accordingly to obtain the motion vectors for both Ref0 and Ref1 (e.g., similar to Eq. (4)). Said differently, for example, video encoder 20 and/or video decoder 30 may scale the motion trajectory based on a temporal distance between the current frame and the first reference frame and a temporal distance between the current frame and the second reference frame.

Video encoder 20 and/or video decoder 30 may search the two regions separately without imposing a mirrored constraint. Initially, video encoder 20 and/or video decoder 30 may fix the MV0 and search for MV1, and then video encoder 20 and/or video decoder 30 may fix the best MV1 and search for MV0, and so on. This process may continue until there are no changes in both MV0 and MV1. Said differently, for example, video encoder 20 and/or video decoder 30 may refine a first motion vector of the motion vector trajectory that specifies the first initial position based on the matching difference between the first initial position and the second initial position to generate a first refined motion vector and refine a second motion vector of the motion vector trajectory that specifies the second initial position based on the first refined motion vector.

Video encoder 20 and/or video decoder 30 may use a metric perform the search for the motion vector refinement such as, for example, but not limited to the Sum of Absolute Difference (SAD), Mean-Removed SAD (MR-SAD), Sum of Squared Difference (SSD), Normalized Cross-Correlation (NCC), or the Structural Similarity Index (SSIM). Said differently, for example, video encoder 20 and/or video decoder 30 may determine the matching difference between the first initial position and the second initial position based a metric, wherein the metric comprises one or more of a SAD, a MR-SAD, SSD, NCC, or a SSIM.

Video encoder 20 and/or video decoder 30 may use a metric based on the block size. Said differently, for example, video encoder 20 and/or video decoder 30 may select the metric from a plurality of metrics based on a size of the current block. For large-sized blocks, for instance, video encoder 20 and/or video decoder 30 may use MR-SAD, NCC, or SSIM. Said differently, for example, video encoder 20 and/or video decoder 30 may select the metric as MR-SAD, NCC, or SSIM when the size of the current block exceeds a block size threshold. For small-sized blocks, for example, video encoder 20 and/or video decoder 30 may use SAD or SSE. Said differently, for example, video encoder 20 and/or video decoder 30 may select the metric as SAD or SSE when the size of the current block does not exceed a block size threshold. The threshold to distinguish between small or large block can be pre-defined, or signaled via the high-level syntax such as SPS, PPS, or slice header. In some examples, video encoder 20 and/or video decoder 30 may select a metric to perform the search based on other high-level syntax elements. For example, when a slice-level flag (e.g., IC flag) indicating whether luminance change present is set to 1, video encoder 20 and/or video decoder 30 may use MR-SAD as the metric for search in motion vector refinement.

In a third technique, for FRUC template matching, video encoder 20 and/or video decoder 30 may selectively disable the sub-block motion refinement to reduce the extra seedings introduced by the sub-block motion search. For example, video encoder 20 and/or video decoder 30 may add a slice-level switch to determine whether the sub-block motion refinement is enabled. Video encoder 20 may make such a decision based on the statistics of the previous frames. For example, if the average block size of the previous frame is greater than a threshold, video encoder 20 may enable the sub-block motion refinement. In some examples, if the average block size of the previous frame is not greater than a threshold, video encoder 20 may disable the sub-block motion refinement. In some example, video encoder 20 may completely disable the sub-block motion refinement.

Video encoder 20 may partially disable the sub-block motion refinement. For example, for the sub-blocks closer to the top-left positions, video encoder 20 may disable the sub-block motion refinement while for those closer to the bottom-right positions, video encoder 20 may enable the sub-block motion refinement.

The above-mentioned techniques may be applied to certain block sizes, and/or coding modes.

Figure 13:
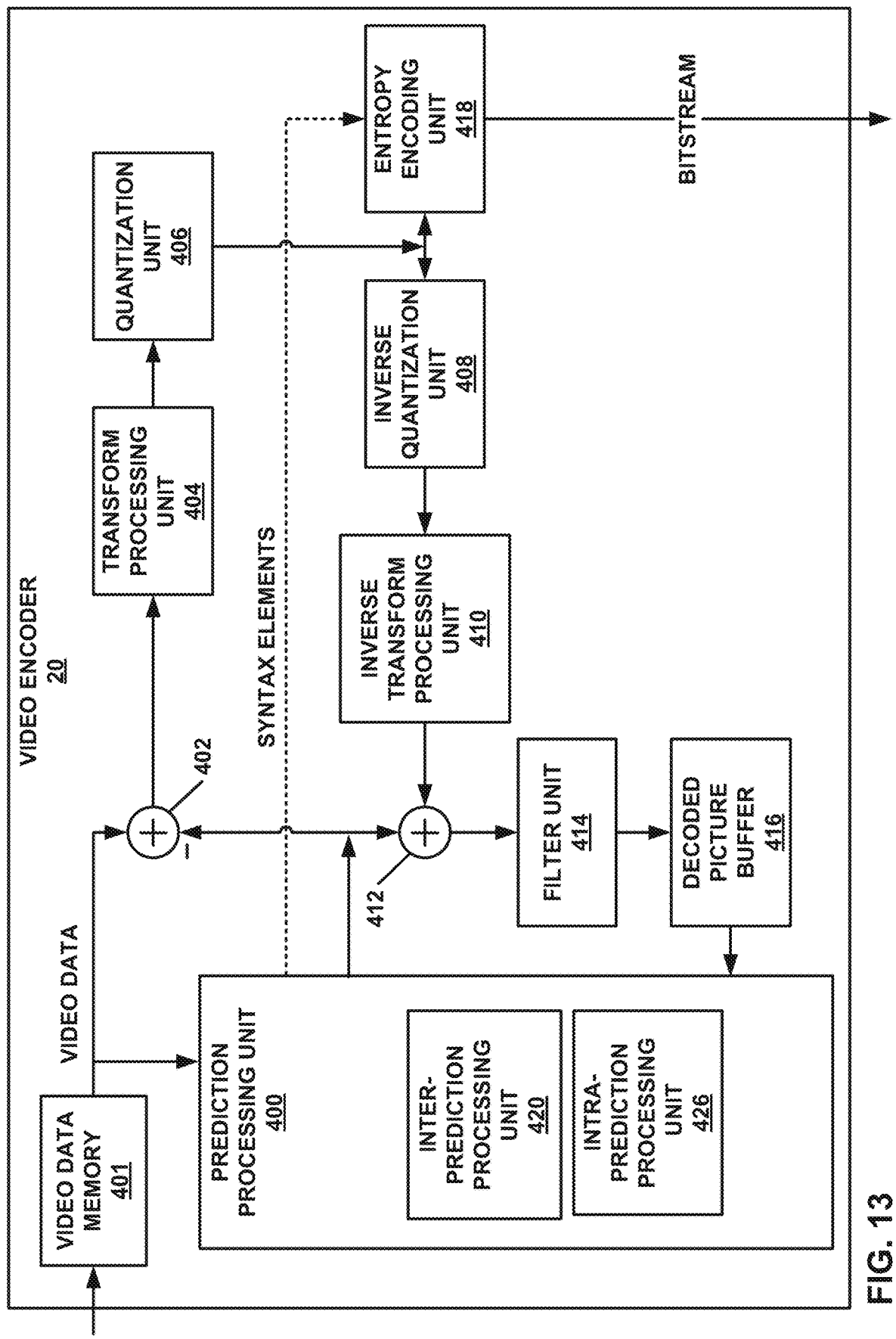
FIG. 13 is a block diagram illustrating an example video encoder that may implement one or more techniques described in this disclosure.

FIG. 13 is a block diagram illustrating an example video encoder 20 that may implement the techniques of this disclosure. FIG. 13 is provided for purposes of explanation and should not be considered limiting of the techniques as broadly exemplified and described in this disclosure. The techniques of this disclosure may be applicable to various coding standards or methods.

In the example of FIG. 13, video encoder 20 includes a prediction processing unit 400, video data memory 401, a residual generation unit 402, a transform processing unit 404, a quantization unit 406, an inverse quantization unit 408, an inverse transform processing unit 410, a reconstruction unit 412, a filter unit 414, a decoded picture buffer 416, and an entropy encoding unit 418. Prediction processing unit 400 includes an inter-prediction processing unit 420 and an intra-prediction processing unit 426. Inter-prediction processing unit 420 may include a motion estimation unit and a motion compensation unit (not shown). Video encoder 20 may be configured to perform one or more techniques described herein for implementing FRUC.

Video data memory 401 may be configured to store video data to be encoded by the components of video encoder 20. The video data stored in video data memory 401 may be obtained, for example, from video source 18. Decoded picture buffer 416 may be a reference picture memory that stores reference video data for use in encoding video data by video encoder 20, e.g., in intra- or inter-coding modes. Video data memory 401 and decoded picture buffer 416 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 401 and decoded picture buffer 416 may be provided by the same memory device or separate memory devices. In various examples, video data memory 401 may be on-chip with other components of video encoder 20, or off-chip relative to those components. Video data memory 401 may be the same as or part of storage media 19 of FIG. 1.

Video encoder 20 receives video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 400 may perform partitioning to divide the CTBs of the CTU into progressively-smaller blocks. The smaller blocks may be coding blocks of CUs. For example, prediction processing unit 400 may partition a CTB associated with a CTU according to a tree structure.

Video encoder 20 may encode CUs of a CTU to generate encoded representations of the CUs (i.e., coded CUs). As part of encoding a CU, prediction processing unit 400 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 420 may generate predictive data for a PU by performing inter prediction on each PU of a CU. The predictive data for the PU may include predictive blocks of the PU and motion information for the PU. Inter-prediction processing unit 420 may perform different operations for a PU of a CU depending on whether the PU is in an I slice, a P slice, or a B slice. In an I slice, all PUs are intra predicted. Hence, if the PU is in an I slice, inter-prediction processing unit 420 does not perform inter prediction on the PU. Thus, for blocks encoded in I-mode, the predicted block is formed using spatial prediction from previously-encoded neighboring blocks within the same frame. If a PU is in a P slice, inter-prediction processing unit 420 may use uni-directional inter prediction to generate a predictive block of the PU. If a PU is in a B slice, inter-prediction processing unit 420 may use uni-directional or bi-directional inter prediction to generate a predictive block of the PU.

Intra-prediction processing unit 426 may generate predictive data for a PU by performing intra prediction on the PU. The predictive data for the PU may include predictive blocks of the PU and various syntax elements. Intra-prediction processing unit 426 may perform intra prediction on PUs in I slices, P slices, and B slices.

To perform intra prediction on a PU, intra-prediction processing unit 426 may use multiple intra prediction modes to generate multiple sets of predictive data for the PU. Intra-prediction processing unit 426 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 426 may use various numbers of intra prediction modes, e.g., 33 directional intra prediction modes. In some examples, the number of intra prediction modes may depend on the size of the region associated with the PU.

Prediction processing unit 400 may select the predictive data for PUs of a CU from among the predictive data generated by inter-prediction processing unit 420 for the PUs or the predictive data generated by intra-prediction processing unit 426 for the PUs. In some examples, prediction processing unit 400 selects the predictive data for the PUs of the CU based on rate/distortion metrics of the sets of predictive data. The predictive blocks of the selected predictive data may be referred to herein as the selected predictive blocks. Prediction processing unit 400 may be configured to perform one or more techniques described herein for determining starting motion vector information of the candidate list of motion vector information for signaling.

Residual generation unit 402 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 402 may generate the residual blocks of the CU such that each sample in the residual blocks has a value equal to a difference between a sample in a coding block of the CU and a corresponding sample in a corresponding selected predictive block of a PU of the CU.

Transform processing unit 404 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 404 may generate transform coefficient blocks for each TU of a CU by applying one or more transforms to the transform blocks of the TU. Transform processing unit 404 may apply various transforms to a transform block associated with a TU. For example, transform processing unit 404 may apply a discrete cosine transform (DCT), a directional transform, or a conceptually similar transform to a transform block. In some examples, transform processing unit 404 does not apply transforms to a transform block. In such examples, the transform block may be treated as a transform coefficient block.

Quantization unit 406 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 406 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information. Thus, quantized transform coefficients may have lower precision than the original ones.

Inverse quantization unit 408 and inverse transform processing unit 410 may apply inverse quantization and inverse transforms to a coefficient block, respectively, to reconstruct a residual block from the coefficient block. Reconstruction unit 412 may add the reconstructed residual block to corresponding samples from one or more predictive blocks generated by prediction processing unit 400 to produce a reconstructed transform block associated with a TU. By reconstructing transform blocks for each TU of a CU in this way, video encoder 20 may reconstruct the coding blocks of the CU.

Filter unit 414 may perform one or more deblocking operations to reduce blocking artifacts in the coding blocks associated with a CU. Decoded picture buffer 416 may store the reconstructed coding blocks after filter unit 414 performs the one or more deblocking operations on the reconstructed coding blocks. Inter-prediction processing unit 420 may use a reference picture that contains the reconstructed coding blocks to perform inter prediction on PUs of other pictures. In addition, intra-prediction processing unit 426 may use reconstructed coding blocks in decoded picture buffer 416 to perform intra prediction on other PUs in the same picture as the CU.

Entropy encoding unit 418 may receive data from other functional components of video encoder 20. For example, entropy encoding unit 418 may receive coefficient blocks from quantization unit 406 and may receive syntax elements from prediction processing unit 400. Entropy encoding unit 418 may perform one or more entropy encoding operations on the data to generate entropy-encoded data. For example, entropy encoding unit 418 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 418. For instance, the bitstream may include data that represents values of transform coefficients for a CU.

Figure 14:
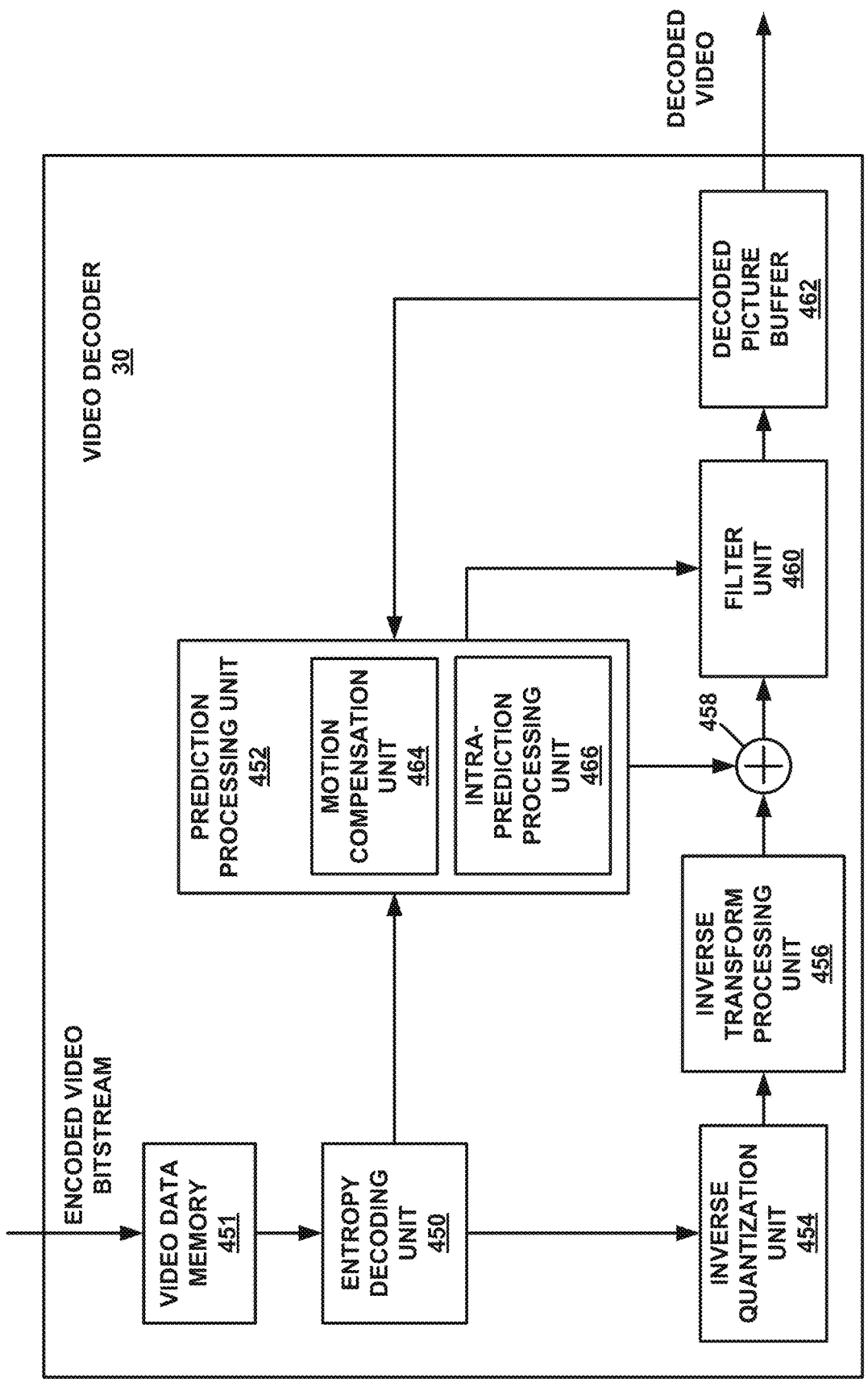
FIG. 14 is a block diagram illustrating an example video decoder that may implement one or more techniques described in this disclosure.

FIG. 14 is a block diagram illustrating an example video decoder 30 that is configured to implement the techniques of this disclosure. FIG. 14 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 14, video decoder 30 includes an entropy decoding unit 450, video data memory 451, a prediction processing unit 452, an inverse quantization unit 454, an inverse transform processing unit 456, a reconstruction unit 458, a filter unit 460, and a decoded picture buffer 462. Prediction processing unit 452 includes a motion compensation unit 464 and an intra-prediction processing unit 466. In other examples, video decoder 30 may include more, fewer, or different functional components. Video decoder 30 may be configured to perform one or more techniques described herein for implementing FRUC.

Video data memory 451 may store encoded video data, such as an encoded video bitstream, to be decoded by the components of video decoder 30. The video data stored in video data memory 451 may be obtained, for example, from computer-readable medium 16, e.g., from a local video source, such as a camera, via wired or wireless network communication of video data, or by accessing physical data storage media. Video data memory 451 may form a coded picture buffer (CPB) that stores encoded video data from an encoded video bitstream. Decoded picture buffer 462 may be a reference picture memory that stores reference video data for use in decoding video data by video decoder 30, e.g., in intra- or inter-coding modes, or for output. Video data memory 451 and decoded picture buffer 462 may be formed by any of a variety of memory devices, such as DRAM, including SDRAM, MRAM, RRAM, or other types of memory devices. Video data memory 451 and decoded picture buffer 462 may be provided by the same memory device or separate memory devices. In various examples, video data memory 451 may be on-chip with other components of video decoder 30, or off-chip relative to those components. Video data memory 451 may be the same as or part of storage media 28 of FIG. 1.

Video data memory 451 receives and stores encoded video data (e.g., NAL units) of a bitstream. Entropy decoding unit 450 may receive encoded video data (e.g., NAL units) from video data memory 451 and may parse the NAL units to obtain syntax elements. Entropy decoding unit 450 may entropy decode entropy-encoded syntax elements in the NAL units. Prediction processing unit 452, inverse quantization unit 454, inverse transform processing unit 456, reconstruction unit 458, and filter unit 460 may generate decoded video data based on the syntax elements extracted from the bitstream. Entropy decoding unit 450 may perform a process generally reciprocal to that of entropy encoding unit 418. Prediction processing unit 452 may be configured to perform one or more techniques described herein for using starting motion vector information of the candidate list of motion vector information that is included in signaling information.

In addition to obtaining syntax elements from the bitstream, video decoder 30 may perform a reconstruction operation on a non-partitioned CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 454 may inverse quantize, i.e., de-quantize, coefficient blocks associated with the TU. After inverse quantization unit 454 inverse quantizes a coefficient block, inverse transform processing unit 456 may apply one or more inverse transforms to the coefficient block in order to generate a residual block associated with the TU. For example, inverse transform processing unit 456 may apply an inverse DCT, an inverse integer transform, an inverse Karhunen-Loeve transform (KLT), an inverse rotational transform, an inverse directional transform, or another inverse transform to the coefficient block.

Inverse quantization unit 454 may perform particular techniques of this disclosure. For example, for at least one respective quantization group of a plurality of quantization groups within a CTB of a CTU of a picture of the video data, inverse quantization unit 454 may derive, based at least in part on local quantization information signaled in the bitstream, a respective quantization parameter for the respective quantization group. Additionally, in this example, inverse quantization unit 454 may inverse quantize, based on the respective quantization parameter for the respective quantization group, at least one transform coefficient of a transform block of a TU of a CU of the CTU. In this example, the respective quantization group is defined as a group of successive, in coding order, CUs or coding blocks so that boundaries of the respective quantization group must be boundaries of the CUs or coding blocks and a size of the respective quantization group is greater than or equal to a threshold. Video decoder 30 (e.g., inverse transform processing unit 456, reconstruction unit 458, and filter unit 460) may reconstruct, based on inverse quantized transform coefficients of the transform block, a coding block of the CU.

If a PU is encoded using intra prediction, intra-prediction processing unit 466 may perform intra prediction to generate predictive blocks of the PU. Intra-prediction processing unit 466 may use an intra prediction mode to generate the predictive blocks of the PU based on samples spatially-neighboring blocks. Intra-prediction processing unit 466 may determine the intra prediction mode for the PU based on one or more syntax elements obtained from the bitstream.

If a PU is encoded using inter prediction, entropy decoding unit 450 may determine motion information for the PU. Motion compensation unit 464 may determine, based on the motion information of the PU, one or more reference blocks. Motion compensation unit 464 may generate, based on the one or more reference blocks, predictive blocks (e.g., predictive luma, Cb and Cr blocks) for the PU.

Reconstruction unit 458 may use transform blocks (e.g., luma, Cb and Cr transform blocks) for TUs of a CU and the predictive blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) for the CU. For example, reconstruction unit 458 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 460 may perform a deblocking operation to reduce blocking artifacts associated with the coding blocks of the CU. Video decoder 30 may store the coding blocks of the CU in decoded picture buffer 462. Decoded picture buffer 462 may provide reference pictures for subsequent motion compensation, intra prediction, and presentation on a display device, such as display device 32 of FIG. 1. For instance, video decoder 30 may perform, based on the blocks in decoded picture buffer 462, intra prediction or inter prediction operations for PUs of other CUs.

Figure 15:
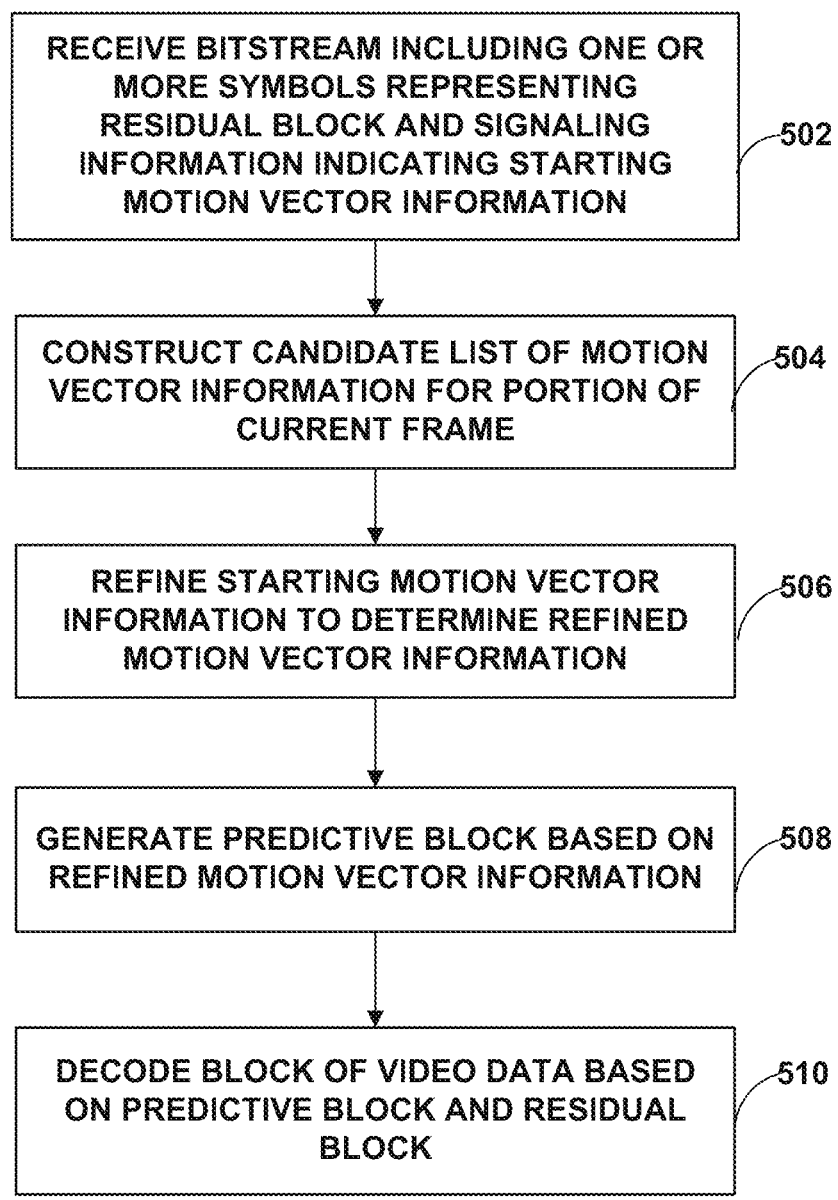
FIG. 15 is a block diagram illustrating an example operation of a video decoder in accordance with one or more techniques described in this disclosure.

FIG. 15 is a block diagram illustrating an example method for video decoding in accordance with one or more techniques described in this disclosure. Initially, video decoder 30 receives a bitstream including one or more symbols representing a residual block and signaling information indicating starting motion vector information (502). Video decoder 30 constructs a candidate list of motion vector information for a portion of a current frame (504). Video decoder 30 refines, based on one or more of bilateral matching or template matching, the starting motion vector information to determine refined motion vector information indicating a refined position in the reference frame that is within a search range from the initial position (506). Video decoder 30 generates a predictive block based on the refined motion vector information (508). Video decoder 30 decodes the current frame based on the predictive block (510).

Figure 16:
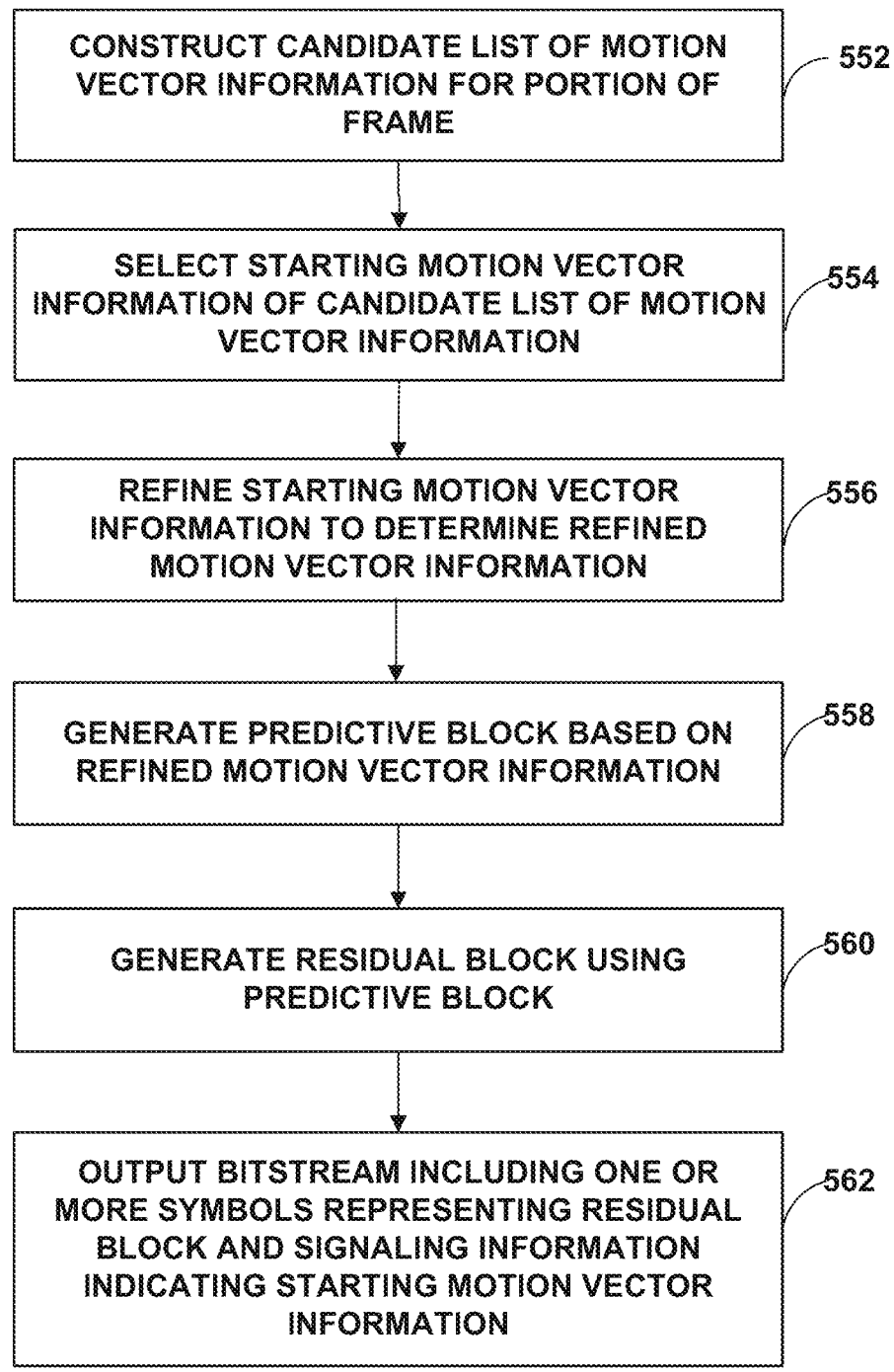
FIG. 16 is a block diagram illustrating an example operation for a video encoder in accordance with one or more techniques described in this disclosure.

FIG. 16 is a block diagram illustrating an example method for video encoding in accordance with one or more techniques described in this disclosure. Initially, video encoder 20 constructs a candidate list of motion vector information for a portion of a current frame (552). Video encoder 20 selects starting motion vector information of the candidate list of motion vector information, the starting motion vector information indicating an initial position in a reference frame (554). Video encoder 20 refines, based on one or more of bilateral matching or template matching, the starting motion vector information to determine refined motion vector information indicating a refined position in the reference frame that is within a search range from the initial position (556). Video encoder 20 generates a predictive block based on the refined motion vector information (558). Video encoder 20 generates residual sample values for the current block of video data based on the predictive block (560). Video encoder 20 outputs a bit stream including one or more symbols representing an indication of the residual sample values and signaling information indicating the starting motion vector information of the candidate list of motion vector information (562).

Certain aspects of this disclosure have been described with respect to extensions of the HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable. In this disclosure, the phrase "based on" may indicate based only on, based at least in part on, or based in some way on. This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions. Example types of video blocks may include coding tree blocks, coding blocks, and other types of blocks of video data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by fixed function and/or programmable processing circuitry, including one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   constructing, by a video decoder implemented in processing circuitry, a candidate list of motion vector information for a portion of a current frame;
   receiving, by the video decoder, signaling information indicating starting motion vector information of the candidate list of motion vector information, the starting motion vector information indicating an initial position in a reference frame;
   refining, by the video decoder, based on one or more of bilateral matching or template matching, the starting motion vector information to determine refined motion vector information indicating a refined position in the reference frame that is within a search range from the initial position;
   determining, by the video decoder, that sub-block motion refinement is disabled for one or more sub-blocks of the portion of the current frame;
   in response to determining that the sub-block motion refinement is disabled for the one or more sub-blocks of the portion of the current frame, generating, by the video decoder, a predictive block based on the refined motion vector information without applying sub-block motion refinement to the one or more sub-blocks of the portion of the current frame; and
   decoding, by the video decoder, the current frame based on the predictive block.

2. The method of claim 1, wherein determining that the sub-block motion refinement is disabled for the one or more sub-blocks is based on a slice-level switch.

3. The method of claim 1, wherein the one or more sub-blocks comprises one or more first sub-blocks, the method further comprising enabling the sub-block motion refinement for one or more second sub-blocks of the portion of the current frame.

4. The method of claim 1, wherein the one or more sub-blocks comprises one or more first sub-blocks and wherein determining that the sub-block motion refinement is disabled for the one or more first sub-blocks comprises determining that the one or more first sub-blocks are arranged in a top-left position of the portion of the current frame, wherein the method further comprises:
   enabling the sub-block motion refinement for one or more second sub-blocks arranged in a bottom-right position of the portion of the current frame.

5. The method of claim 1, wherein determining that the sub-block motion refinement is disabled for the one or more sub-blocks is based on one or more of a block size of the portion of the current frame or a coding mode for the current frame.

6. A device for decoding video data, the device comprising:
   a memory configured to store the video data; and
   processing circuitry configured to:
      construct a candidate list of motion vector information for a portion of a current frame;
      receive signaling information indicating starting motion vector information of the candidate list of motion vector information, the starting motion vector information indicating an initial position in a reference frame;
      refine, based on one or more of bilateral matching or template matching, the starting motion vector information to determine refined motion vector information indicating a refined position in the reference frame that is within a search range from the initial position;
      determine that sub-block motion refinement is disabled for one or more sub-blocks of the portion of the current frame;
      in response to a determination that the sub-block motion refinement is disabled for the one or more sub-blocks of the portion of the current frame, generate a predictive block based on the refined motion vector information without an application of sub-block motion refinement to the one or more sub-blocks of the portion of the current frame; and
      decode the current frame based on the predictive block.

7. The device of claim 6, wherein the processing circuitry is configured to determine that the sub-block motion refinement is disabled for the one or more sub-blocks based on a slice-level switch.

8. The device of claim 6, wherein the one or more sub-blocks comprises one or more first sub-blocks and wherein the processing circuitry is configured to enable the sub-block motion refinement for one or more second sub-blocks of the portion of the current frame.

9. The device of claim 6,
   wherein the one or more sub-blocks comprises one or more first sub-blocks;
   wherein, to determine that sub-block motion refinement is disabled for the one or more first sub-blocks, the processing circuitry is configured to determine that the one or more first sub-blocks are arranged in a top-left position of the portion of the current frame; and
   wherein the processing circuitry is further configured to enable the sub-block motion refinement for one or more second sub-blocks arranged in a bottom-right position of the portion of the current frame.

10. The device of claim 6, wherein the processing circuitry is configured to determine that the sub-block motion refinement is disabled for the one or more sub-blocks based on one or more of a block size of the portion of the current frame or a coding mode for the current frame.

11. The device of claim 6, wherein the device comprises a wireless communication device, further comprising a receiver configured to receive encoded video data.

12. The device of claim 11, wherein the wireless communication device comprises a telephone handset and wherein the receiver is configured to demodulate, according to a wireless communication standard, a signal comprising the encoded video data.

13. A method of encoding video data, the method comprising:
- constructing, by a video encoder implemented in processing circuitry, a candidate list of motion vector information for a portion of a current frame;
- selecting, by the video encoder, starting motion vector information of the candidate list of motion vector information, the starting motion vector information indicating an initial position in a reference frame;
- refining, by the video encoder, based on one or more of bilateral matching or template matching, the starting motion vector information to determine refined motion vector information indicating a refined position in the reference frame that is within a search range from the initial position;
- determining, by the video encoder, that sub-block motion refinement is disabled for one or more sub-blocks of the portion of the current frame;
- in response to determining that the sub-block motion refinement is disabled for the one or more sub-blocks of the portion of the current frame, generating, by the video encoder, a predictive block based on the refined motion vector information without applying sub-block motion refinement to the one or more sub-blocks of the portion of the current frame;
- generating, by the video encoder, residual sample values for the current block of video data based on the predictive block; and
- outputting, by the video encoder, an indication of the residual sample values and signaling information indicating the starting motion vector information of the candidate list of motion vector information.

14. A device for encoding video data, the device comprising:
- a memory configured to store the video data; and
- processing circuitry configured to:
    - construct a candidate list of motion vector information for a portion of a current frame;
    - select starting motion vector information of the candidate list of motion vector information, the starting motion vector information indicating an initial position in a reference frame;
    - refine, based on one or more bilateral matching or template matching, the starting motion vector information to determine refined motion vector information indicating a refined position in the reference frame that is within a search range from the initial position;
    - determine that sub-block motion refinement is disabled for one or more sub-blocks of the portion of the current frame;
    - in response to a determination that the sub-block motion refinement is disabled for the one or more sub-blocks of the portion of the current frame, generate a predictive block based on the refined motion vector information without an application of sub-block motion refinement to the one or more sub-blocks of the portion of the current frame;
    - generate residual sample values for the current block of video data based on the predictive block; and
    - output an indication of the residual sample values and signaling information indicating the starting motion vector information of the candidate list of motion vector information.

15. The device of claim 14, wherein the device comprises a wireless communication device, further comprising a transmitter configured to transmit encoded video data.

16. The device of claim 15, wherein the wireless communication device comprises a telephone handset and wherein the transmitter is configured to modulate, according to a wireless communication standard, a signal comprising the encoded video data.

17. The method of claim 13, wherein determining that the sub-block motion refinement is disabled for the one or more first sub-blocks comprises determining that the one or more first sub-blocks are arranged in a top-left position of the portion of the current frame.

18. The method of claim 13, wherein determining that the sub-block motion refinement is disabled for the one or more sub-blocks is based on one or more of a block size of the portion of the current frame or a coding mode for the current frame.

19. The device of claim 14, wherein, to determine that the sub-block motion refinement is disabled for the one or more first sub-blocks, the processing circuitry is configured to determine that the one or more first sub-blocks are arranged in a top-left position of the portion of the current frame.

20. The device of claim 14, wherein the processing circuitry is configured to determine that the sub-block motion refinement is disabled for the one or more sub-blocks based on one or more of a block size of the portion of the current frame or a coding mode for the current frame.

* * * * *